(12) United States Patent
Stafford

(10) Patent No.: US 10,228,811 B2
(45) Date of Patent: *Mar. 12, 2019

(54) SYSTEMS AND METHODS FOR PROVIDING FEEDBACK TO A USER WHILE INTERACTING WITH CONTENT

(71) Applicant: Sony Interactive Entertainment Inc., Tokyo (JP)

(72) Inventor: Jeffrey Roger Stafford, Redwood City, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/659,494

(22) Filed: Jul. 25, 2017

(65) Prior Publication Data

US 2017/0322655 A1 Nov. 9, 2017

Related U.S. Application Data

(63) Continuation of application No. 14/503,275, filed on Sep. 30, 2014, now Pat. No. 9,746,984.

(Continued)

(51) Int. Cl.
*A63F 9/00* (2006.01)
*G06F 3/048* (2013.01)
(Continued)

(52) U.S. Cl.
CPC ............ *G06F 3/048* (2013.01); *A63F 13/212* (2014.09); *A63F 13/213* (2014.09); *A63F 13/28* (2014.09);
(Continued)

(58) Field of Classification Search
None
See application file for complete search history.

(56) References Cited

U.S. PATENT DOCUMENTS 5,577,981 A * 11/1996 Jarvik ................. A63B 21/154
434/247
5,690,582 A * 11/1997 Ulrich ................... A63B 22/02
482/4
(Continued)

FOREIGN PATENT DOCUMENTS

CN 103785169 A 5/2014

OTHER PUBLICATIONS

Chinese Application No. CN201580043581X Search Report from the First Office Action, dated Feb. 7, 2018, pp. 11-12, dated Jan. 29, 2018.

*Primary Examiner* — Seng Heng Lim
(74) *Attorney, Agent, or Firm* — Penilla IP, APC

(57) ABSTRACT

Systems and methods for providing feedback to a user are described. One of the methods includes sending interactive data for rendering on a head mounted display (HMD). The HMD is configured for attachment to a head of a user for playing a game. The method further includes receiving image data associated with a body part of the user while the HMD is worn by the user and the HMD renders interactive content. The method includes tracking a spatial position associated with the body part of the user from the image data of the user. In the method, physical placement of a remote-controlled device at the spatial position associated with the body part of the user is rendered in the HMD as virtual contact with an object in the interactive content.

21 Claims, 20 Drawing Sheets

Related U.S. Application Data

(60) Provisional application No. 62/039,374, filed on Aug. 19, 2014.

(51) Int. Cl.

| | |
|---|---|
| *H04N 13/344* | (2018.01) |
| *A63F 13/825* | (2014.01) |
| *G02B 27/01* | (2006.01) |
| *G06F 3/01* | (2006.01) |
| *G06F 3/0481* | (2013.01) |
| *A63F 13/213* | (2014.01) |
| *A63F 13/212* | (2014.01) |
| *A63F 13/28* | (2014.01) |

(52) U.S. Cl.
CPC ............ *A63F 13/825* (2014.09); *G02B 27/01* (2013.01); *G02B 27/017* (2013.01); *G06F 3/011* (2013.01); *G06F 3/012* (2013.01); *G06F 3/013* (2013.01); *G06F 3/017* (2013.01); *G06F 3/04815* (2013.01); *H04N 13/344* (2018.05); *A63F 2300/1037* (2013.01); *A63F 2300/1087* (2013.01); *A63F 2300/8082* (2013.01)

(56) References Cited

U.S. PATENT DOCUMENTS

| | | | | |
|---|---|---|---|---|
| 5,890,995 | A | * | 4/1999 | Bobick ................. A53F 13/245 434/247 |
| 6,152,854 | A | * | 11/2000 | Carmein .............. A63B 22/025 198/779 |
| 9,345,967 | B2 | | 5/2016 | Zhang et al. |
| 9,547,438 | B2 | | 1/2017 | Bromer |
| 9,823,752 | B2 | | 11/2017 | Bromer |
| 2012/0257035 | A1 | | 10/2012 | Larsen |
| 2012/0326961 | A1 | | 12/2012 | Bromer |
| 2013/0237378 | A1 | * | 9/2013 | Carrell ................. A63C 17/061 482/51 |
| 2014/0213361 | A1 | | 7/2014 | Zhang et al. |
| 2017/0075429 | A1 | | 3/2017 | Bromer |

\* cited by examiner

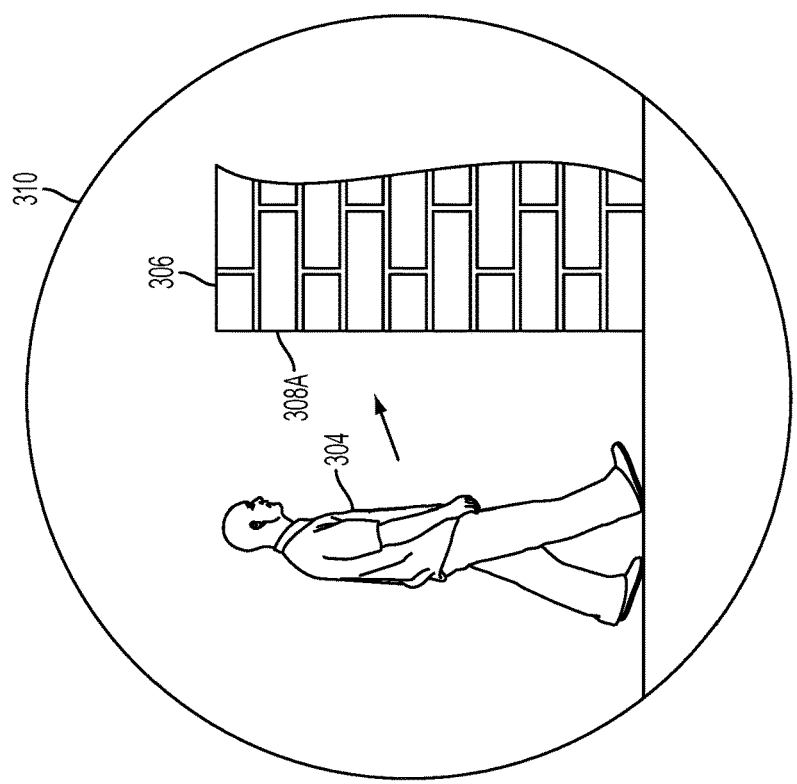
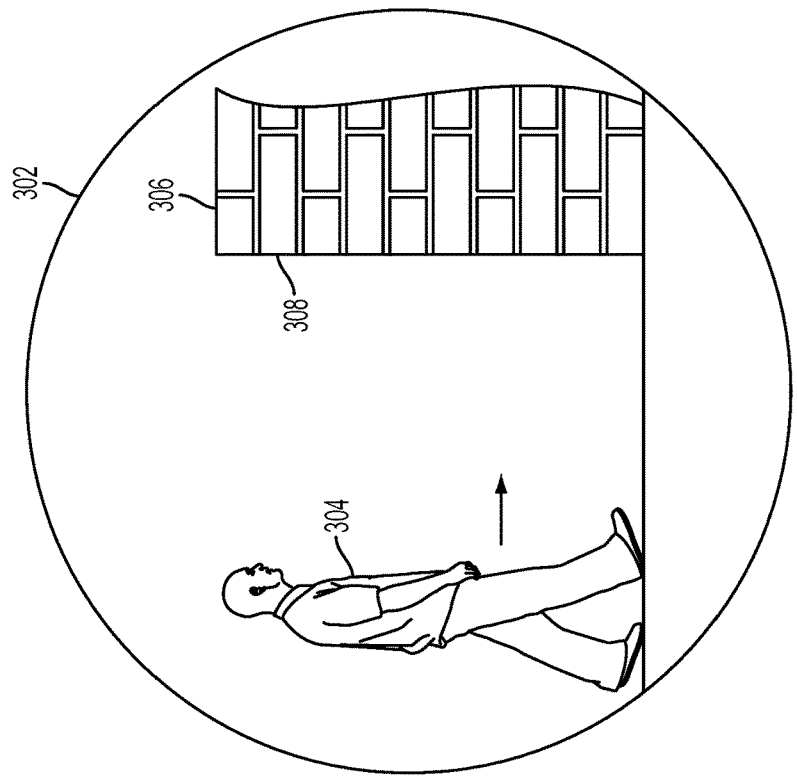

HMD VIEW (1ST PERSON VIEW)

HMD VIEW (3RD PERSON VIEW)

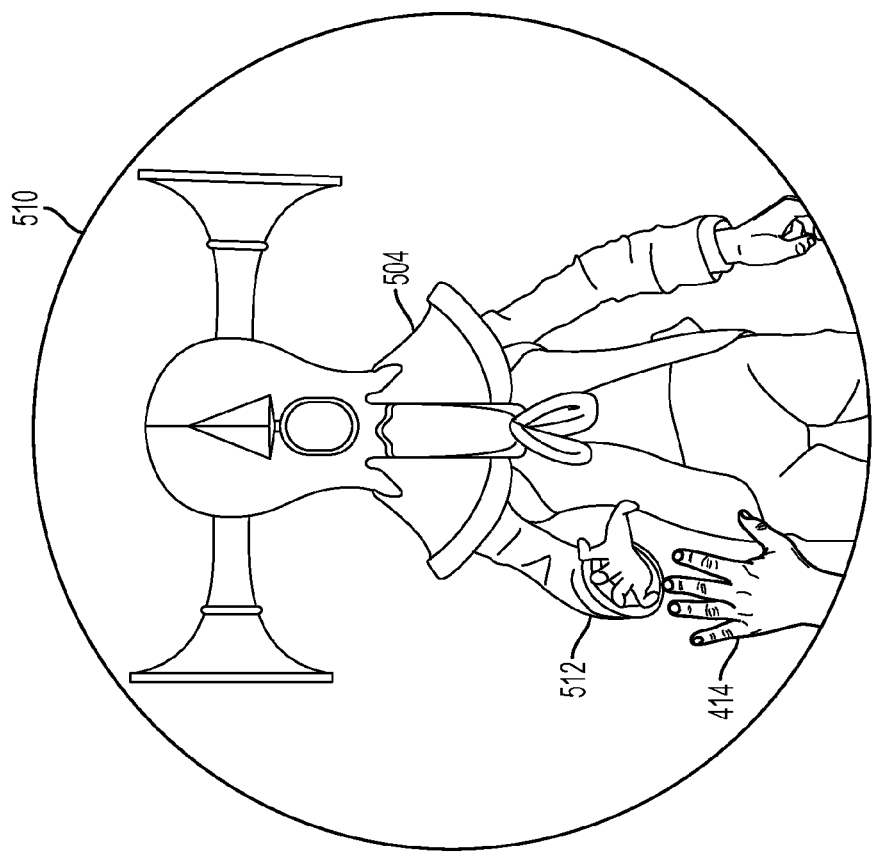
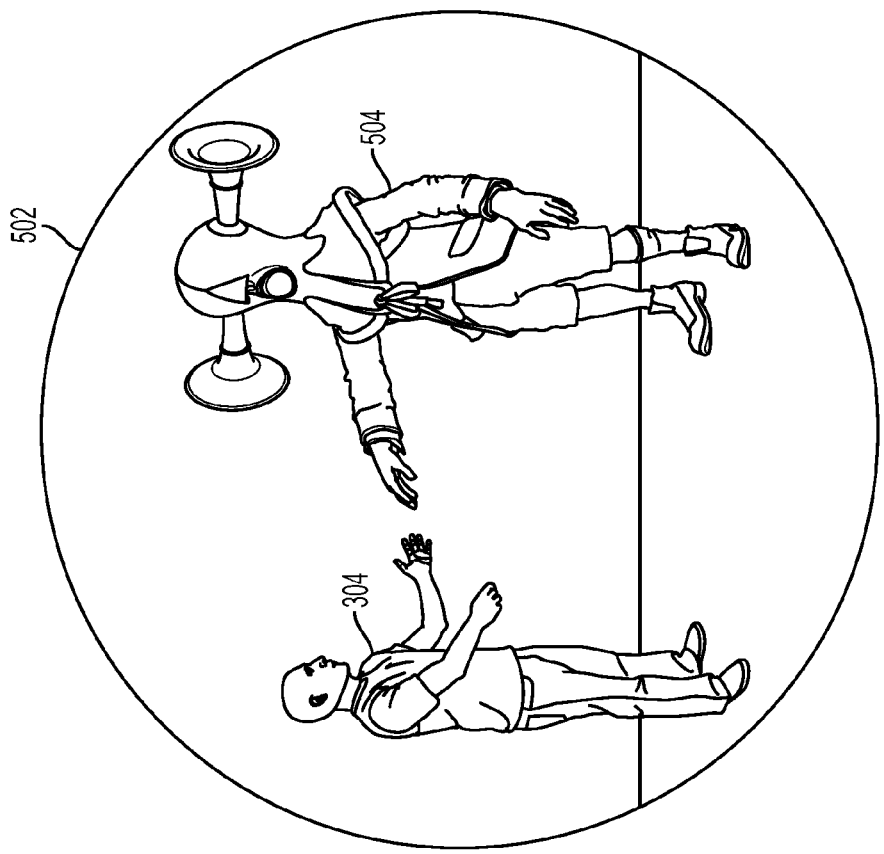
FIG. 5B HMD VIEW (1ST PERSON VIEW)
FIG. 5A HMD VIEW (3RD PERSON VIEW)

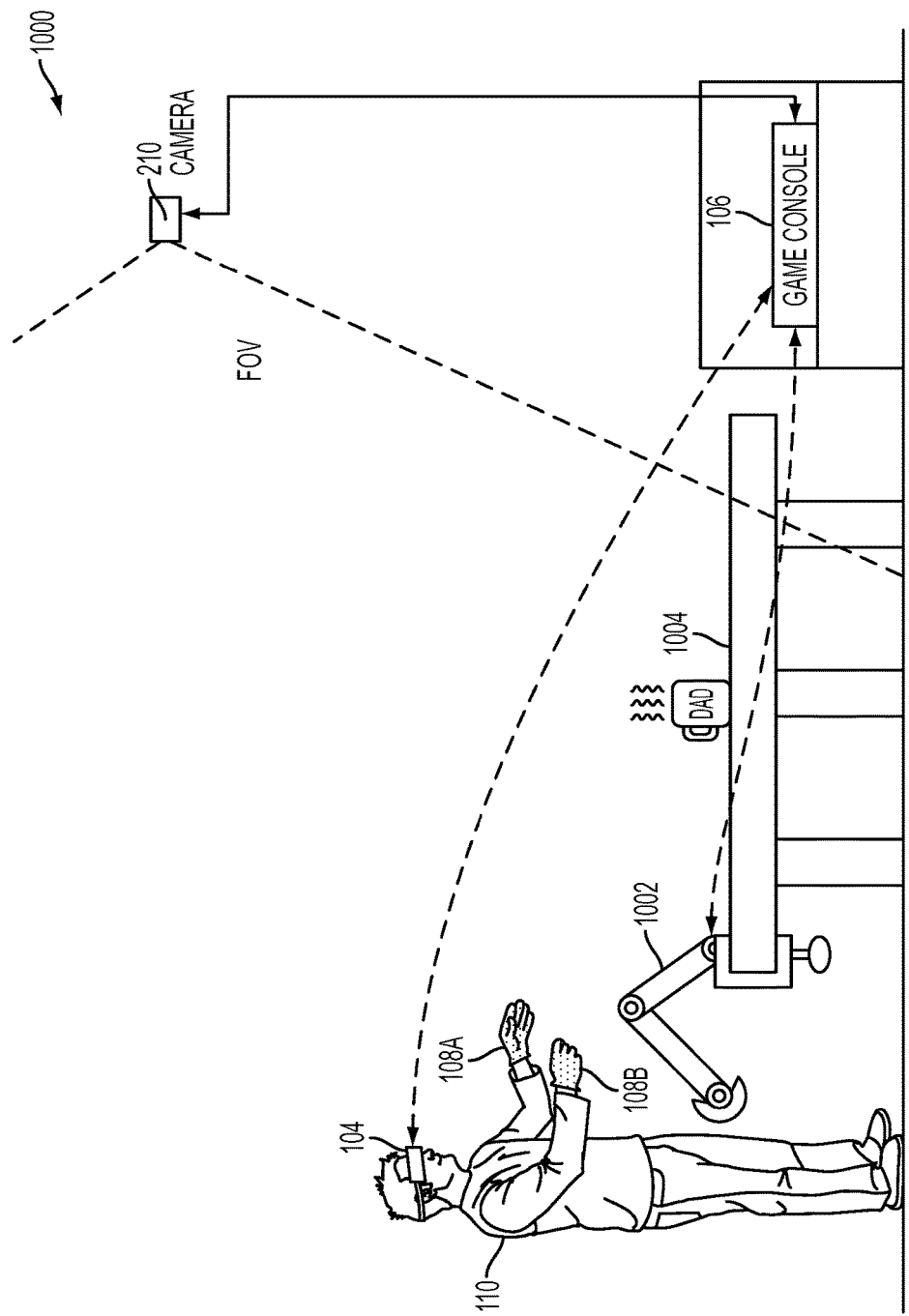

400; # SYSTEMS AND METHODS FOR PROVIDING FEEDBACK TO A USER WHILE INTERACTING WITH CONTENT

CLAIM OF PRIORITY

This application is a continuation of and claims the benefit of and priority, under 35 U.S.C. § 120, to U.S. application Ser. No. 14/503,275, which claims the benefit of and priority, under 35 U.S.C. § 119(e), to U.S. Provisional Patent Application No. 62/039,374, filed on Aug. 19, 2014, and titled "Systems and Methods for Providing Feedback To a User While Interacting with Content", both of which are hereby incorporated by reference in their entirety.

FIELD

The present disclosure relates to systems and methods for providing feedback to a user while interacting with content.

BACKGROUND

A variety of devices have been created to provide a user with various capabilities. For example, a user can see an image of a person while talking to the person over the Internet. As another example, a user can play video games using a closely-held display device. As yet another example, a user can use a smart phone to access the Internet, or to access various computer programming applications, or to send or receive images over the Internet.

A variety of games are available for play using these devices. However, even though so many games have been created, sometimes, the user gets bored and is looking for a different experience. For example, the user is looking for an experience that will engage the user in these games.

Also, while the user is using these devices for a variety of purposes, the user sometimes gets so involved during the use of these devices that the user could get into an accident. For example, while the user uses the closely-held display device, the user bumps into a glass table or a sharp-cornered object.

SUMMARY

Embodiments of the present disclosure provide systems and methods for providing feedback to a user while interacting with content.

In some embodiments, while the user is interacting with a computer application via an image, a processor determines a spatial relationship between a body part of the user as displayed in the image and another virtual object in the image. When the spatial relationship is within a pre-defined range, e.g., in virtual touch, in virtual contact, etc., in which the image representing the body part is close to the image of the virtual object, the processor determines to control a remotely-controlled device, e.g., a vehicle, a machine, a robot, a drone, etc., to come in physical contact with the body part of the user. The contact provides the user with feedback during interaction with the image. Moreover, in case the user is in harm's way, e.g., about to collide with a sharp object, about to fall off stairs, etc., the feedback reduces chances of an accident.

One of the methods includes sending interactive data for rendering on a head mounted display (HMD). The HMD is configured for attachment to a head of a user for playing a game. The method further includes receiving image data associated with a body part of the user while the HMD is worn by the user and the HMD renders interactive content. The method includes tracking a spatial position associated with the body part of the user from the image data associated with the body part of the user, and for a state of rendering by the HMD and for the spatial position associated with the body part, controlling a position of a remotely-controlled device (RCD) to place the RCD proximate to the spatial position associated with the body part. In the method, physical placement of the RCD at the spatial position associated with the body part of the user is rendered in the HMD as virtual contact with an object in the interactive content.

In some embodiments, the image data associated with the body part includes image data of a position device, e.g., a hand-held controller, a joystick, a remote controller, a light emitter, a light emitting diode, a glove controller, a PlayStation Move™ controller manufactured by Sony Computer Entertainment™, Inc., etc. The position device is attached to, e.g., attached to via Velcro™, glued to, worn on, etc., the body part of the user or is held by the user in his/her hand.

In various embodiments, the spatial position associated with the body part includes a spatial position of the position device. In several embodiments, the spatial position associated with the body includes a spatial position of the body part.

A system includes an HMD for displaying a game. The HMD is for mounting on a head of a user for playing the game. The system further includes a game console coupled to the HMD. The game console includes a gaming processor. The gaming processor is for sending interactive content for rendering in the HMD, receiving image data associated with a body part of the user while the HMD is worn by the user and the HMD renders the interactive content, and tracking a spatial position associated with the body part of the user from the image data. The gaming processor is also used for generating an instruction based on a current state of rendering by the HMD and the spatial position associated with the body part, and sending the instruction to an RCD to control a position of the RCD to place the RCD proximate to the spatial position associated with the body part. Moreover, physical placement of the RCD at the spatial position associated with the body part of the user is rendered in the HMD as virtual contact with an object in the interactive content.

An RCD includes a communication circuit for receiving an instruction from a game console. The RCD further includes a mechanical component, a contact surface, and a position controller coupled to the mechanical component and to the communication circuit. The position controller is for controlling a position of the contact surface based on the instruction, and for controlling the mechanical component to further control the position of the contact surface. The position controller also controls the position of the contact surface to place the contact surface proximate to a spatial position associated with a body part of a user during a play of a game, which has interactive content. Physical placement of the contact surface at the spatial position associated with the body part of the user is rendered in a HMD as virtual contact with an object in the interactive content.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

Various embodiments of the present disclosure are best understood by reference to the following description taken in conjunction with the accompanying drawings in which:

FIG. 3A is a diagram of a scene from a third person's view for display in a head mounted display (HMD), in accordance with one embodiment of the present disclosure.

FIG. 3B is a diagram of an embodiment of a scene that is generated in a similar manner as that of the scene of FIG. 3A, in accordance with one embodiment of the present disclosure.

FIG. 5A is a diagram of a scene in which an avatar is shaking hands with a virtual monster in a scene, in accordance with one embodiment of the present disclosure.

FIG. 5B is a diagram of an embodiment of a scene that is similar to the scene of FIG. 5A except being from a first person's view, in accordance with one embodiment of the present disclosure.

FIG. 10 is a diagram of a system in which a robotic arm is used to provide the user with a better experience while interacting with a scene displayed in the HMD, in accordance with one embodiment of the present disclosure.

DETAILED DESCRIPTION

Systems and methods for providing feedback to a user while interacting with content are described. It should be noted that various embodiments of the present disclosure are practiced without some or all of these specific details. In other instances, well known process operations have not been described in detail in order not to unnecessarily obscure various embodiments of the present disclosure.

In one embodiment, the system includes a computer, a controller, and a display. In various embodiments, the computer is a general purpose computer, a special purpose computer, or other such device which executes an interactive program, e.g., a computer software program, a computer software application, etc., for generating interactive data, which is rendered to display the interactive content on a display device. In some embodiments, instead of the computer, a game console is used. Examples of game consoles include those manufactured by Sony Computer Entertainment™, Inc. and other manufacturers. Examples of the display device include a television, a monitor, a projector display, a head mounted display (HMD), or other such displays and display systems which are capable of receiving and rendering video output from the computer. A user provides input to the interactive program by operating a controller. In some embodiments, the controller communicates wirelessly with the computer, as this provides for greater freedom of movement of the controller than a wired connection. In various embodiments, the controller includes any of various features for providing input to the interactive program, such as buttons, a joystick, a directional pad, a trigger, a touchpad, a touch screen, a glove, markers, or other types of input mechanisms. One example of a controller is the Sony Dualshock 4™ controller manufactured by Sony Computer Entertainment, Inc. Examples of markers include light emitting diodes (LEDs), colored straps, light emitters, infrared (IR) light emitters, retro reflective markers, etc.

Furthermore, in some embodiments, the controller is a motion controller that enables the user to interface with and provide input to the interactive program by moving the controller. One example of a motion controller is the PlayStation Move™ controller. Various technologies are employed to detect a spatial position and movement of a motion controller. For example, a motion controller includes various types of motion detection hardware, such as accelerometers, gyroscopes, and magnetometers.

In some embodiments, a motion controller includes one or more cameras, which captures images of a fixed reference object. The spatial position and movement of the motion controller is then determined through analysis of the images captured by the one or more cameras.

In several embodiments, a motion controller includes an illuminated element which is tracked via a camera having a fixed position.

Figure 1:
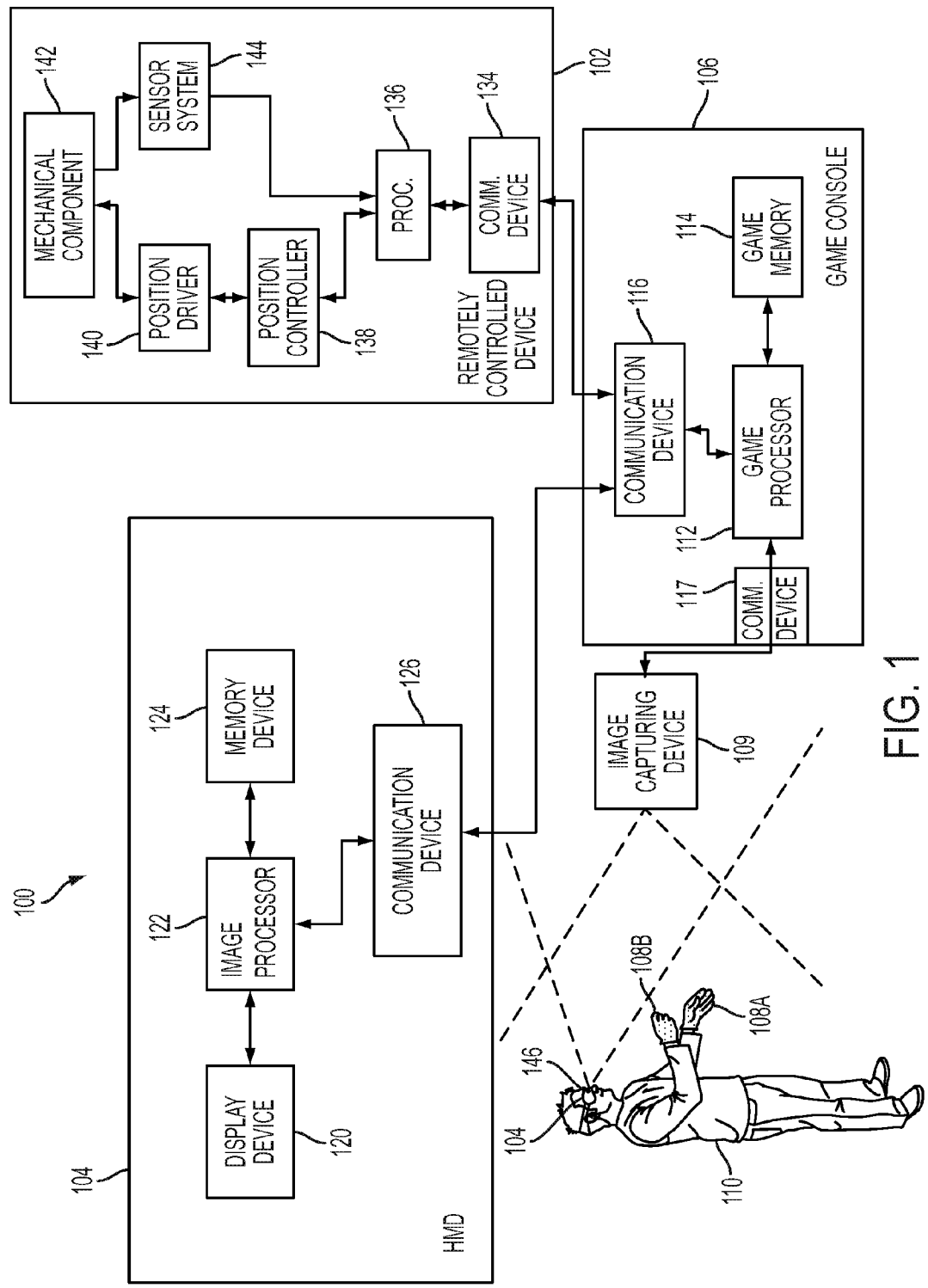
FIG. 1 is a diagram of a system for interactively engaging a user with interactive content with use of a remotely-controlled device (RCD), in accordance with one embodiment of the present disclosure.

FIG. 1 is a diagram of an embodiment of a system 100 for interactively engaging a user 110 with the interactive content by using a remotely-controlled device (RCD) 102. The system 100 includes an HMD 104, a game console 106, and an image capturing device 109. The system 100 further includes a controller 108, e.g., a glove 108A and a glove 108B. The gloves 108A and 108B wrap around a hand of the user 110.

Examples of the RCD 102 include a drone, a quad copter drone, a robot, a robotic arm, a robotic foot, etc. In some embodiments, the drone is an aircraft that is unmanned and is controlled either autonomously by onboard computers or by the game console 106. For example, the game console 106 communicates with the drone to launch or land the drone or to position the drone at a spatial position.

In various embodiments, the robot is a mechanical agent, usually an electro-mechanical machine that is guided by a computer program or electronic circuitry, e.g. a game processor 112 of the game console 106, etc.

In several embodiments, the HMD 104 is a display device, worn on a head of the user 110 or as part of a helmet that has a small display optic in front of one or each eye. An example of the HMD 104 includes an optical head-mounted display (OHMD), which is a wearable display that is capable of projecting images and allows the user 110 to see through the OHMD. Further examples of the HMD 104 include an eyeglass and/or a visor. As an example, the HMD 104 has one or two small display devices with lenses. The display devices are miniaturized and include display screens, e.g., a cathode ray tube (CRT) display screen, a liquid crystal display (LCD) display screen, a liquid crystal on silicon (LCOS) display screen, an LED display screen, etc. The HMD 104 is capable of displaying a computer generated image (CGI), or is capable of showing live images from a real-world environment, or a combination of both. The CGI is a virtual image. Examples of the combination of the CGI and the live images include the CGI superimposed on a real-world view, e.g., a photo of the real-world environment, a captured image of the real-world environment, etc. When the CGI is superimposed on the real-world view, an augmented reality (AR) or a mixed reality image is generated.

Examples of the image capturing device 109 include a digital camera, an infrared camera, a video camera, a phone camera, and a tablet camera.

In some embodiments, instead of or in addition to the image capturing device 109, a number of light sensors, e.g., light detectors, infrared light detectors, etc., are used to determine positions, e.g., positions in an xyz co-ordinate system, etc. of a body part of the user 110.

In various embodiments, instead of the gloves 108A and 108B, a game controller is used. Examples of the game controller include a joystick, or a keyboard, or a mouse, or a set of markers, or a game pad, or a trackball, or a steering wheel, or a yoke, or a touch screen, or a PlayStation Move™ controller, or a motion controller, or a navigation controller, or a light gun, or a sword-shaped controller, or a knife-shaped controller, or a hammer-shaped controller, or a pen-shaped controller, or a guitar controller, or a rhythm game controller. The game controller is a device used with games or entertainment systems to provide input to a video game, to control an object or character in the game.

In some embodiments, the game controller is held by the user 110 or is attached to a body part, e.g., hand, legs, palm, finger, toes, etc., of the user 110. For example, the controller 108 is a strip of LEDs that fits to a finger of the user 110.

The game console 106 includes the game processor 112, a game memory 114, a communication device 116, and a communication device 117. As used herein, examples of a processor includes a central processing unit (CPU), a microprocessor, an application specific integrated circuit (ASIC), and a programmable logic device (PLD). Moreover, as used herein, examples of a memory include a read-only memory (ROM), a random access memory (RAM), or a combination thereof. A memory is a volatile memory or a non-volatile memory. Further examples of a memory include a flash memory, a redundant array of storage disks (RAID), a hard disk, a cache, a virtual memory, etc. Also, a communication device, as used herein, is a wired communication device that communicates via a wired medium, e.g., one or more physical electrical conductors, etc., with another device or a wireless communication device that communicates wirelessly with another device. Examples of the wireless communication include radio frequency (RF) communication, a wireless data communication, a Wi-Fi communication, a Bluetooth communication, a communication using acoustic energy, a communication using light energy, and a communication using magnetic energy. A wired communication device applies a standard, e.g., Ethernet, Institute of Electrical and Electronics Engineers (IEEE) 1394, serial, parallel, Universal Series Bus (USB), etc., to transfer data between two devices.

The HMD 104 includes a display device 120, an image processing unit (IPU) 122, a graphics memory device 124, and a communication device 126. Examples of the display device 120 are provided above. Moreover, the RCD 102 includes a communication device 134, a processor 136, a position controller 138, a position driver 140, a mechanical component system 142, and a sensor system 144.

In some embodiments, the IPU 122 is an electronic circuit that displays images on the display device 120 of the HMD 104. In these embodiments, frames of images for display are generated by a graphical processing unit (GPU) of the game console 106 and sent to the IPU 122 for display on the display device 120. In some embodiment, the GPU of the game console 106 is integrated within the game processor 112.

In various embodiments, the IPU 122 is a specialized electronic circuit that is designed to rapidly manipulate and alter data in the graphics memory device 124 to accelerate creation of frames in a frame buffer intended for output to the display device 120.

It should be noted that in various embodiments, instead of the IPU 122, a CPU is used to perform operations performed by the IPU 122.

In various embodiments, the position controller 138 includes a processor and a memory device. The position controller 138 controls a spatial position, e.g., an x position, a y position, and a z position, etc., of a contact surface of the RCD 102 via the mechanical component 142 and the position driver 142. For example, the position controller 138 is a speed controller that controls a speed of rotation of the mechanical component 142 to change a height of a contact surface of the RCD 102 from a floor. As another example, the position controller 138 is an acceleration controller that controls an acceleration of rotation of the mechanical component 142 to change an amount of time taken to reach the height from the floor. The sensor system 144 includes a number of sensors that measure speed and acceleration of the RCD 102, and the speed and acceleration are sent to the processor 136 by the sensor system 144. The processor 136 determines a spatial position of a contact surface of the RCD 102 based on the speed or acceleration, a prior known spatial position of the contact surface, and time period since the contact surface is at the spatial position. If the determined spatial position does not match a pre-determined spatial position, the processor 136 sends a signal indicating a speed amount and/or an acceleration amount to the position controller 138 to achieve the pre-determined spatial position.

In several embodiments, the sensor system 144 includes a compass, a global positioning system (GPS), a gyroscope, a magnetometer, a sensor that measures barometric pressure, etc. The barometric pressure is received by the processor 136 from the barometric pressure sensor and the processor 136 determines the y spatial position, e.g., an altitude hold, etc., from the barometric pressure. Moreover, the GPS position of the RCD 102 that is measured by the GPS is provided to the processor 136. Based on the GPS position and/or the spatial position determined from the speed and acceleration, a spatial position of a contact surface of the RCD 102 is controlled by the processor 136.

The image capturing device 109 captures image data of a contact surface of the RCD 102. The image data showing a spatial position of the contact surface of the RCD 102 is provided via the communication device 117 to the game processor 112. The game processor 112 determines the spatial position of the contact surface of the RCD 102 in the real-world environment from the image data of the contact surface of the RCD 102 to determine whether the contact surface is at a spatial position in the real-world environment that corresponds to a spatial position of a virtual world object in a scene that is displayed in the HMD 104. Examples of the virtual world object and a scene are provided below.

In some embodiments, the functions described herein as performed by the position controller 138 are performed by the processor 136. In these embodiments, the RCD 102 does not have the position controller 138.

In various embodiments, the RCD 102 includes a number of mechanical components, and the same number of position drivers, the same number of sensor systems, and the same number of position controllers. The processor 136 is coupled to the position controllers. In these embodiments, each position controller controls a corresponding mechanical component and each sensor system measures barometric pressure of an environment surrounding the corresponding mechanical component, or an orientation of the corresponding mechanical component, or a speed of the corresponding mechanical component, or an acceleration of the corresponding mechanical component, or a spatial position of the corresponding mechanical component, or a direction in which the corresponding mechanical component is moving, or a combination thereof. Each sensor system generates a signal from the measurement. The processor 136 determines a corresponding spatial position of the corresponding mechanical component from the measurements or receives the corresponding spatial position, and upon receiving the spatial position from the processor 136, the position controller 138 controls a speed and/or acceleration of the corresponding mechanical component to further control a spatial position of the corresponding mechanical component.

Speeds and accelerations of multiple mechanical components are controlled to achieve a change in spatial position and/or orientation of a contact surface of the RCD 102. For example, a first propeller of the RCD 102 is rotated faster than a second propeller of the RCD 102 to achieve a change in spatial position and/or orientation from contact of the body part with one contact surface of the RCD 102 to another contact surface of the RCD 102.

As used herein, the position driver 140 includes one or more transistors that generate an electric current based on a voltage that is applied to the one or more transistors. The electric current is used to drive, e.g., start, stop, change direction of rotation, change direction of movement, change direction of translation motion, etc., of the mechanical component 142.

Examples of the mechanical component 142 include a combination of a motor and a propeller, a combination of a motor and a robotic arm, a combination of a motor and a robotic leg, and a combination of a motor and another robotic device.

The game processor 112 executes an interactive program, which is stored in the game memory 114, to generate the interactive data, which in some embodiments, is stored in the game memory 114.

In some embodiments, the interactive data is received as image data of one or more images that are captured by an external camera 146 of the HMD 104. The image data that is captured by the external camera 146 of the HMD 104 is sent via the communication devices 126 and 117 to the game processor 112 for storage in the game memory 114.

It should be noted that in some embodiments, the HMD 104 includes any number of external cameras. In various embodiments, the HMD 104 includes any number of internal cameras, which capture a motion of the head of the user 104 or of eyes of the user 104 or of mouth of the user 104. The internal camera faces the user 104 to capture images of a body part, e.g., mouth, eyes, head, etc., of the user and the external camera faces the real-world environment, e.g., a room, an office, a landmark, an outdoor place, an indoor place, etc., surrounding the user 104 to capture images of the real-world environment.

In various embodiments, the interactive data is received via a computer network, e.g., the Internet, an Intranet, a wide area network a local area network, etc., by the communication device 116 from a computing device and provided to the game processor 112 for storage in the game memory 114. Examples of the computing device include a smart phone, a cell phone, a tablet, a desktop computer, a laptop computer, etc.

In some embodiments, the interactive data is game data that is used to play a virtual game. Examples of the virtual game include a swordfight game, a soccer game, a mission-fulfillment game, an army game, a hitman game, a tennis game, a sports game, a violent game, a nonviolent game, a game involving skills, a game involving mathematics, etc.

In several embodiments, the interactive data is processed by the game processor 112 to generate a game state of the virtual game. The game state of the virtual game is an example of the interactive data. For example, the user 110 provides an input, e.g., a finger gesture, a hand gesture, a hand movement, a foot movement, a body movement, a body part gesture, etc., to the controller 108. In some embodiments, the input is provided to the HMD 104 instead of or in addition to the controller 108. The image capturing device 109 captures an image of the input that is provided by the user 110. The image of the input is sent from the image capturing device 109 via the communication device 117 to the game processor 112. The game processor 112 executes the interactive program, e.g., a game program, etc., that is stored in the memory device 114 to generate a next state of the interactive program, etc., based on the image and the interactive data, e.g., a current state of the virtual game, etc. The next state of the interactive program is an example of a state that is executed by the game processor 112 to generate the interactive data. For example, the game processor 112 executes the game program to generate a virtual sword in the virtual game. As another example, the game processor 112 executes the game program to allow a virtual user in the virtual game to jump over a virtual wall.

Examples of the state of the interactive program include active, idle, etc. The active state is a state when the interactive program is being executed by the game processor 112 to determine another state of the interactive program. Each active state is executed to generate a scene in the HMD 104. The idle state is a state when the interactive program is not being executed by the game processor 112. For example, when the interactive program is waiting for input from the user 110 via the controller 108, the interactive program is in the idle state.

In some embodiments, the game processor 112 receives image data captured by the external camera 146 of the HMD 104 via the communication device 117. The image data captured by the external camera 146 is that of the real-world environment surrounding the user 110. The game processor 112 superimposes virtual image data, e.g., the CGI data, etc., on the image data regarding the real-world environment surrounding the user 110 to generate the AR data. The AR data is another example of the interactive data.

The game processor 112 sends the interactive data via the communication device 116 to the HMD 104 for display on one or more display screens of the display device 120 of the HMD 104. The communicative device 126 of the HMD 104 receives the interactive data and provides the interactive data to the IPU 122. The IPU 122 stores the interactive data in the memory device 124. The IPU 122 renders the interactive data to generate the interactive content, e.g., an interactive image, an interactive video, an interactive AR scene, an interactive virtual reality (VR) scene, streaming media streamed via the computer network, any scene described herein, etc. The interactive VR scene is an example of the CGI. The interactive content is displayed by the IPU 122 on the one or more display screens of the display device 120.

When the interactive content is being displayed on the display device 120, the RCD 102 is being controlled by the processor 136 for operation. For example, the RCD 102 is flying, e.g., cruising at an altitude, etc., in the air within a pre-determined distance from the body part of the user 110 when the interactive content is being displayed on the display device 120. As another example, the RCD 102 is stationary and is within a pre-determined distance from the body part of the user 110 when the interactive content is being displayed on the display device 120. To further illustrate, the RCD 102 is docked, e.g., at a docking station, at a charging station, etc., when the interactive content is being displayed on the display device 120.

When the interactive content is being displayed on the display device 120, the user 110 moves his/her body part and/or the controller 108 to interact with the interactive content. For example, the user 110 desires to touch virtual flowers in the virtual game or to pick up a virtual sword in the virtual game or to shake hands with a virtual hero in the virtual game.

The image capturing device 109 captures an image of a spatial position of the body part of the user 110 while the user 110 is interacting with the interactive content displayed in the HMD 104. For example, the image capturing device 109 takes a picture or a video of the controller 108. As another example, the image capturing device 109 takes a picture or a video of the body part of the user 110.

The image capturing device 109 provides the image of the spatial position of the body part of the user 110 via the communication device 117 to the game processor 112. Upon receiving the image of the spatial position of the body of the user 110, the game processor 112 determines the spatial position of the body part from image data of the image. For example, the game processor 112 determines the spatial position of the body part in the real-world environment based on a scaling between the real-world environment and a virtual world and the spatial position of the body part in the image data. The scaling, e.g., a scaling amount, a scaling level, etc., is stored in the game memory 114. As another example, the game processor 112 applies a scaling to distances between various objects of the image data to generate distances between the same objects in the real-world environment to determine the spatial position of the body part in the real-world environment.

The game processor 112 further determines whether an input is received from the user 110 based on the spatial position of the body part in the image data. For example, when there is a change in the spatial position of the body part in the image data that is associated with a state of the interactive application, the game processor 112 determines that the input that changes the state is received. The input received from the user 110 affects, e.g., changes, modifies, etc., a state of the interactive data. Upon determining that the input is received, the game processor 112 determines a next state of the interactive program based on the input and a current state of the interactive data. The current state of the interactive data is affected by the input received from the user 110 to generate the next state of the interactive application.

Upon determining the spatial position of the body part in the image data that is captured using the image capturing device 109, the game processor 112 associates, e.g., translates, converts, etc., the spatial position to a spatial position of a representation of the body part in a scene. The scene is an example of the interactive content. For example, as the image data shows that the body part of the user 110 is moving in a direction, the game processor 112 moves the representation of the body part in the same direction in a scene that is displayed in the HMD 104. As another example, as the image data shows that the body part of the user 110 is moving in a direction, the game processor 112 includes the representation of the body part in a scene that is displayed in the HMD 104. Examples of the representation of the body part in a scene include a virtual representation of the body part, a video image of the body part, etc. A scene includes the virtual world object, which has a spatial position in the scene with respect to a spatial position of the representation of the body part in the scene.

The game processor 112 determines whether the spatial position of the representation of the body part in the scene is within a pre-determined distance, e.g., a distance of 0, a distance of 1 millimeter, a distance ranging from 1 millimeter to 5 millimeters, etc., of the spatial position of the virtual world object that is displayed in the scene. Upon determining that the spatial position is within the pre-determined distance, the game processor 112 sends an instruction to the processor 136 via the communication devices 116 and 134 to control the mechanical component 142 to achieve a spatial position in the real world of a contact surface of the RCD 102. The spatial position of a contact surface of the RCD 102 is achieved to be within a pre-determined distance in the real world from the body part of the user 110. The position of the body part of the user 110 is determined from the image data of the body part captured by the image capturing device 109.

It should be noted that in some embodiments, in the game memory 114, each state of the interactive data that includes the virtual world object is associated with a spatial position of the RCD 102. For example, the current state of the interactive data that includes the virtual world object is mapped to a first spatial position or a first set of spatial positions of a contact surface of the RCD 102 and the next state of the interactive data that includes the virtual world object is mapped to a second spatial position or a second set of spatial positions of a contact surface of the RCD 102. As another example, when the current state of the interactive data that includes the virtual world object is being displayed in the HMD 104, the RCD 102 is controlled by the processor 136 to achieve the first spatial position or the first set of spatial positions and when the next state of the interactive data that includes the virtual world object is being displayed in the HMD 104, the RCD 102 is controlled by the processor 136 to achieve the second spatial position or the second set of spatial positions.

The next state of the interactive data is sent via the communication devices 116 and 126 to the IPU 122 to render the interactive content associated with the next state on the display device 120. Moreover, in addition to sending the next state of the interactive data to the HMD 104, the game processor 112 sends a signal to the processor 136 via the communication devices 116 and 134 indicating that the interactive content associated with the next state is to be displayed on the display device 120.

The processor 136 receives the indication of the next state of the interactive data from the game processor 112 via the communication devices 116 and 134 and sends a signal to the spatial position controller 138 to change a spatial position of a contact surface the RCD 102 to achieve the second spatial position or the second set of spatial positions of the contact surface of the RCD 102. The second spatial position or the second set of spatial positions of the contact surface of the RCD 102 to be achieved is associated with the next state.

The spatial position controller 138 determines a speed and/or an acceleration of the mechanical component 142 to achieve the second spatial position or the second set of spatial positions, further determines or identifies an amount of current to be produced by the position driver 140 to achieve the speed and/or acceleration, and sends the amount of current to the position driver 140. It should be noted that in some embodiments, a correspondence between a position, a speed, an acceleration, and an amount of current is stored in a memory device of the position controller 138. The position driver 140 sends a current signal having the amount of current to the mechanical component 142 to operate the mechanical component 142 with the speed and/or acceleration to achieve the second spatial position or the second set of spatial positions.

In various embodiments, the processor 136 controls the RCD 102 to place the RCD 102 proximate to the body part. For example, the processor 136 controls the RCD 102 so that a contact surface of the RCD touches the body part in the real-world environment. As another example, the processor 136 controls the RCD 102 so that a contact surface of the RCD 102 has the same spatial position as that of the body part in the real-world environment. As yet another example, the processor 136 controls the RCD 102 so that a contact surface of the RCD 102 is within a pre-determined distance of the body part. The pre-determined distance is stored within a memory device (not shown) of the RCD 102. The memory device of the RCD 102 is coupled to the processor 136. In some embodiments, the pre-determined distance is stored in the game memory 114 and provided to the processor 136 via the communication devices 116 and 134 by the game processor 112 for positioning the RCD 102 at the pre-determined distance from the body part.

In some embodiments, a real-world spatial position includes an x co-ordinate, a y co-ordinate, and a z co-ordinate. In various embodiments, a spatial position in the virtual world, e.g., an AR scene, a VR scene, a video, an image, etc., includes an x co-ordinate position and a y co-ordinate position.

In several embodiments, a spatial position in the virtual world includes an x co-ordinate, a y co-ordinate, and a z co-ordinate. In these embodiments, multiple image capturing devices are used to capture a spatial position including depth information, e.g., the z co-ordinate, etc., of a body part of the user 110. The image capturing devices are connected to the game processor 112 via the communication device 117 to provide image data to the game processor 112 for analysis.

In some embodiments, instead of the game console 106, a computer or a smart television is used. Examples of the computer used include a desktop computer, a laptop computer, a tablet, or a smart cellular phone.

It should be noted that instead of images being displayed on the display device 120 (FIG. 1) of the HMD 104 (FIG. 1), in some embodiments, the images are displayed on a display device of device, e.g., a display device of a television, a display device of a computer, a display device of a smart phone, a display device of a tablet, etc.

In various embodiments, instead of the game processor 112 (FIG. 1) and the game memory 114 being included within the game console 106, the game processor 112 and the game memory 114 are included within the HMD 104. For example, the HMD 104 includes a processor that executes all of the functions described herein as being performed by the game processor 112. In these embodiments, the HMD 104 communicates with the computer network via a communication device, e.g., a network interface card, a network interface controller, etc. For example, the processor of the HMD 104 receives the interactive data from a server of the computer network via the communication device.

In some embodiments, the user 110 carries a computing device, e.g., a cell phone, a tablet, a laptop, etc. The computing device receives the interactive data from a server of the computer network and provides the interactive data to the IPU 122 of the HMD 104 for display of the interactive content on the display device 120 of the HMD 104. In these embodiments, the game console 106 is not used. In the embodiments, the functions described herein as being executed by the game processor 112 and the game memory 114 are performed by a processor and a memory of the computing device.

Figure 2:
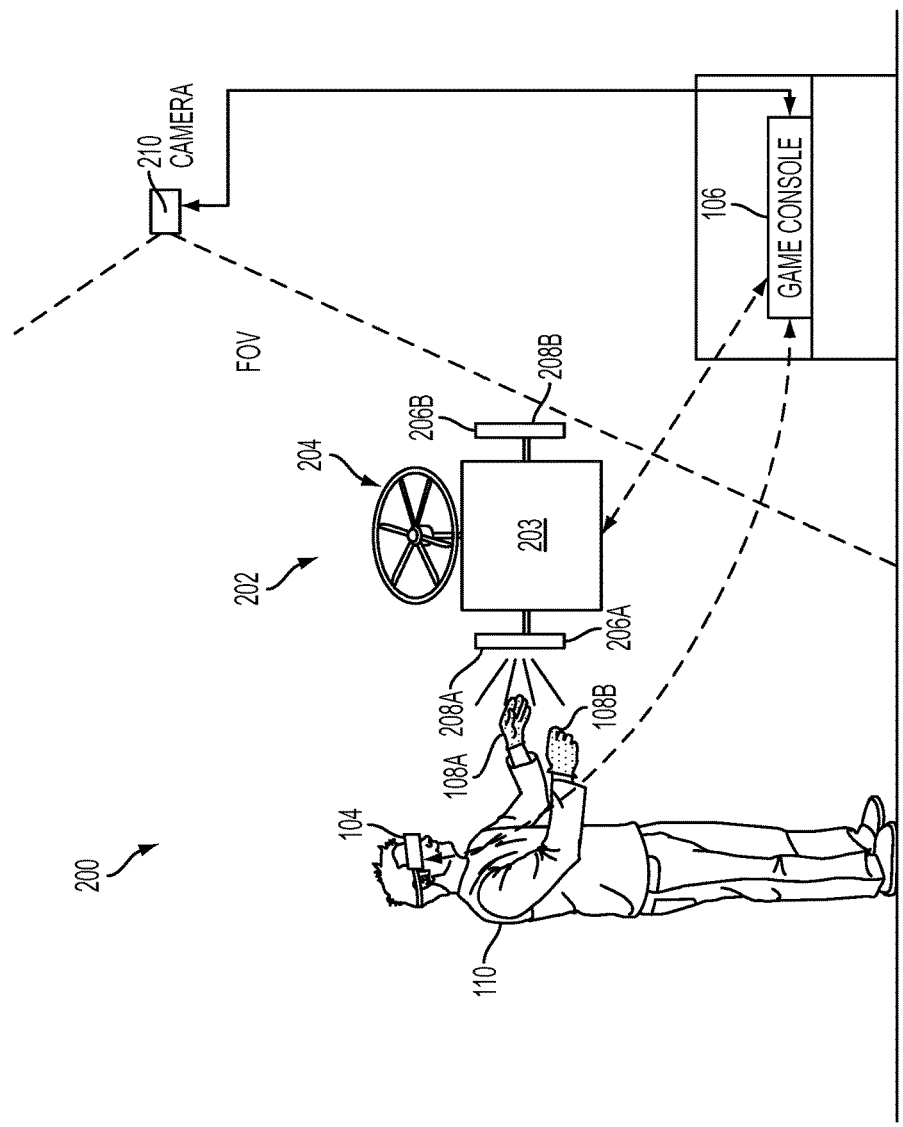
FIG. 2 is a diagram of a system to illustrate interaction of the user with a drone, in accordance with one embodiment of the present disclosure.

FIG. 2 is a diagram of an embodiment of a system 200 to illustrate interaction of the user 110 with a drone 202, which is an example of the RCD 102 (FIG. 1). The drone 202 includes a center body 203, one or more propellers 204, and contact objects 206A and 206B. The one or more propellers 204 provide a lift to the drone 202. Each contact object 206A and 206B is attached to an opposite side of the center body 203.

In some embodiments, each contact object 206A and 206B is attached to any side of the center body 203. For example, the contact object 206A is attached to a first side of the center body 203 and the contact object 296B is attached to a second side of the center body 203. The second side is adjacent to the first side.

In various embodiments, instead of a contact object being attached to a side of the center body 203, the contact object is a housing that encloses a drone and that is attached to the drone. Examples of the housing include a cage or a housing with walls.

In various embodiments, a number of center objects, e.g., three, four, etc., are attached to the center body 203.

Each contact object has a contact surface that faces a side opposite to that of the center body 203. For example, the contact object 206A has a contact surface 208A and the contact object 206B has another contact surface 208B.

A contact surface is designed to provide feedback to the body part of the user 110. For example, the contact surface 208A has a tactile feedback mechanism that provides a tactile feedback to the body part of the user 110 when the contact surface 208A touches the body part. As another example, the contact surface 208B has an electrical feedback mechanism that provides an electrical current to the body part of the user 110. As yet another example, the contact surface 208B is made of a rough material, e.g., is a ribbed surface, is a brick surface, etc., or is made of a smooth material, e.g., is a flat surface, is a metal surface, etc. As another example, the contact surface 208B is made of a material, e.g., cloth, steel, wood, etc., that is pleasant to the user 110 to touch. To illustrate, the contact surface 208B is a surface of a punching bag that is attached to a drone or a robot. As yet another example, the contact surface 208A is ergonomic that contours to the body part the contact surface 208A are designed to come in contact with the body part of the user.

In some embodiments the contact object 206A is different than the contact object 206B. For example, the contact object 206A is made of a different material than that of the contact object 206B. As another example, the contact object 206A includes a tactile feedback mechanism and the contact object 206B lacks a tactile feedback mechanism. As yet another example, the contact surface 208A is smooth and the contact surface 208B is ribbed.

In several embodiments, the game processor 112 determines whether a representation of the body part of the user 110 in a scene that is displayed in the HMD 104 is in virtual contact with a virtual object of a first type or of a second type. An example of the virtual object of the first type includes a virtual object having a rough surface and an example of the virtual object of the second type includes a virtual object having a smooth surface. Upon determining that the representation of the body part of the user 110 is in contact with the smooth surface of the virtual object, the game processor 112 sends a signal to the processor 136 to control the mechanical component 142 to further position the contact surface 208A to be in contact with the body part of the user 110. On the other hand, upon determining that the representation of the body part of the user 110 is in contact with the rough surface of the virtual object, the game processor 112 sends a signal to the processor 136 to control the mechanical component 142 to further position the contact surface 208B to be in contact with the body part of the user 110.

The system 200 further includes a camera 210, which is an example of the image capturing device 109 (FIG. 1). The camera 210 is supported on a support, e.g., a stand, a television, an electronic equipment, etc., within a room.

In some embodiments, a number of cameras, e.g., two, three, etc., are used to capture images of the body part of the user 110 and/or of the gloves 108A and 108B that are worn by the user 110.

In various embodiments, the gloves 108A and 108B have markers that allow for ease of image capturing by the camera 210. For example, the markers are colored or emit light. To further illustrate, the markers are LEDs. As another example, the markers reflect light and are retro-reflective. In several embodiments, the gloves 108A and 108B do not have any markers.

In some embodiments, instead of or in addition to a camera, a sensor, e.g., an optical sensor, a light detector, etc., is used to detect light, and to convert light into electrical signals. For example, the gloves 108A and 108B are fitted with light emitters, and light that is emitted from the emitters is detected by the sensor to convert the light into electrical signals. The electrical signals are provided to the game processor 112 for analysis, e.g., determining a spatial position of the body part of the user 110 in the real world.

In various embodiments, an inertial sensor, e.g., a gyroscope, an accelerometer, etc., is used instead of or in addition to the light sensors. The inertial sensor is fitted on or in the gloves 108A and 108B or on the controller 108 to measure a position and/or an orientation of the hand of the user 110. The position and/or the orientation are communicated via the communication device 117 to the game processor 112.

In several embodiments, an inertial sensor is used instead of or in addition to use of the image capturing device 109. The inertial sensor is fitted to the body part of the user 110 or to the gloves 108A and 108B to provide a position and/or an orientation of the body part of the user 110. The position and/or the orientation is provided from the inertial sensor via the communication device 116 to the processor 136 of the RCD 102. The processor 136 sends the position and/or the orientation to the position controller 136. The position controller 136 determines a speed and/or acceleration of the mechanical component 142 based on the orientation and further determines or identifies an amount of current to achieve the speed and/or acceleration. It should be noted that in some embodiments, a correspondence between an orientation, a speed, an acceleration, and an amount of current is stored in a memory device of the position controller 138. The amount of current is provided to the position driver 140, which generates the amount of current to control the mechanical component 142 to achieve the orientation.

The game console 106 sends the interactive data to the HMD 104 for display of the interactive content. The user 110 interacts with the interactive content displayed on the one or more display screens of the HMD 104. While the user 110 is interacting with the interactive content, the drone 202 flies near the user 110. As the user 110 moves his/her hands, the gloves 108A and 108B move. Movement of the hands and/or the gloves 108A and 108B lie within a field-of-view (FOV) of the camera 210 and is captured by the camera 210 to generate image data. The movement of the hands and/or the gloves 108A and 108B is an example of the input that is provided to the game console 106. The image data captured by the camera 210 is provided to the game console 106. The game console 106 parses the image data to identify the input from the image data. The game console 106 further determines how the input that is identified affects the current state of the interactive data to further determine the next state of the interactive data. The game console 106 sends the next state of the interactive data to the HMD 104 for display of the next state as the interactive content.

Moreover, the game console 106 identifies from within the memory device 114 (FIG. 1) of the game console 106 a spatial position or a set of spatial positions that is mapped to the next state of the interactive data. The spatial position or the set of spatial positions identified by the gaming console 106 are sent from the gaming console 106 to the drone 202. In some embodiments, the spatial position or the set of spatial positions identified are sent at the same time as that of sending the next state of the interactive data to the HMD 104. In various embodiments, the spatial position or the set of spatial positions identified are sent within, e.g., before, after, etc., a pre-determined time period of sending the next state of the interactive data to the HMD 104. The drone 202 controls speed and/or acceleration of the one or more propellers 204 to achieve the spatial position or the set of spatial positions of the contact surface 208A or 208B of the drone 202.

It should be noted that while the user 110 is viewing the interactive content corresponding to the next state of the interactive data on the one or more display screens of the HMD 104, the spatial position or the set of spatial positions corresponding to the next state is achieved using the drone 202. For example, when the user 110 is touches a virtual monster in the virtual game, the drone 202 is positioned so that the glove 108B worn by the user 110 touches the contact surface 208A. As another example, when the user 110 is lifts a virtual gun in the virtual game, the drone 202 is positioned near the user 110 so that the glove 108A worn by the user 110 touches the contact surface 208B.

The touch to the contact surface 206A and/or the contact surface 206B allows the user 110 a real-world like experience while interacting with the interactive content.

FIG. 3A is a diagram of an embodiment of a scene 302 from a third person's view, e.g., from a standpoint of a bystander. The scene 302 is displayed in the HMD 104 (FIG. 1). For example, the scene 302 is displayed in the HMD 104 when the game program is executed by the game processor 112 (FIG. 1). The scene 302 shows an avatar 304 walking towards a virtual wall 306. The avatar 304 is a virtual representation of the user 110 (FIG. 1). For example, the game processor 112 executes the interactive program to generate virtual image data, which is sent via the communication device 116 (FIG. 1) of the game console 106 and the communication device 126 of the HMD 106 to the IPU 122 (FIG. 1) for display of the avatar 304. Moreover, the virtual wall 306 is displayed on the one or more display screens of the HMD 104 when the interactive program is executed by the game processor 112 and a rendering program is executed by the IPU 122 to display the virtual wall 306.

It should be noted that the user 110 moves his/her hands and/or legs and the avatar 304 moves simultaneously in the scene 302 with the movement of the hands and/or the legs. For example, the image capturing device 109 (FIG. 1) captures images of the movement of the hands and/or legs of the user 110 to generate image data, which is provided via the communication device 117 of the game console 106 to the game processor 112. The game processor 112 executes the interactive program to move hands and/or legs of the avatar 304 in a similar manner as that of the movement of the hands and/or legs of the user 110. For example, when the user 110 raises his/her right hand, the avatar 304 raises his/her right hand. As another example, when the user 110 raises his/her left leg, the avatar 304 raises his/her left hand. As yet another example, when the user 110 stops moving his/her hands and/or his/her legs, the avatar 304 stops walking and when the user 110 starts moving his/her hands and/or his/her legs, the avatar starts walking.

It should be noted that in several embodiments, the user 110 is not actually walking for the avatar 304 to walk in the scene 302. For example, the user 110 moves his/her hands for the avatar 304 to walk in the scene 302. In some embodiments, the user 110 is actually walking for the avatar 304 to walk in the scene 302.

FIG. 3B is a diagram of an embodiment of a scene 310 that is generated in a similar manner as that of the scene 302. The scene 310 is displayed from a third person's view and is displayed in the HMD 104 (FIG. 1). In the scene 310, the avatar 304 moves closer to the virtual wall 306 compared to a spatial position of the avatar 304 with respect to the virtual wall 306 in the scene 302. The avatar 304 moves closer to the virtual wall 306 when the user 110 exhibits further hand and/or leg movements compared to that exhibited for the avatar 304 to achieve the spatial position illustrated in the scene 302 (FIG. 3A).

Figure 4B:
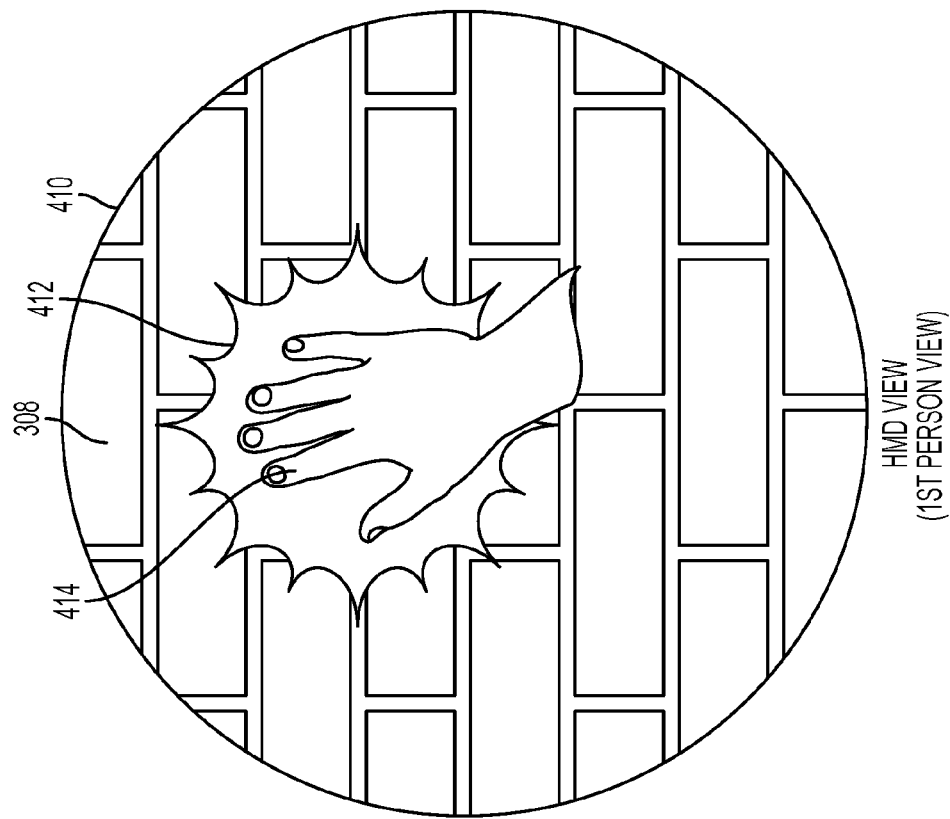
FIG. 4B is a diagram of an embodiment of a scene from a first person's view for display in the HMD, in accordance with one embodiment of the present disclosure.
Figure 4A:
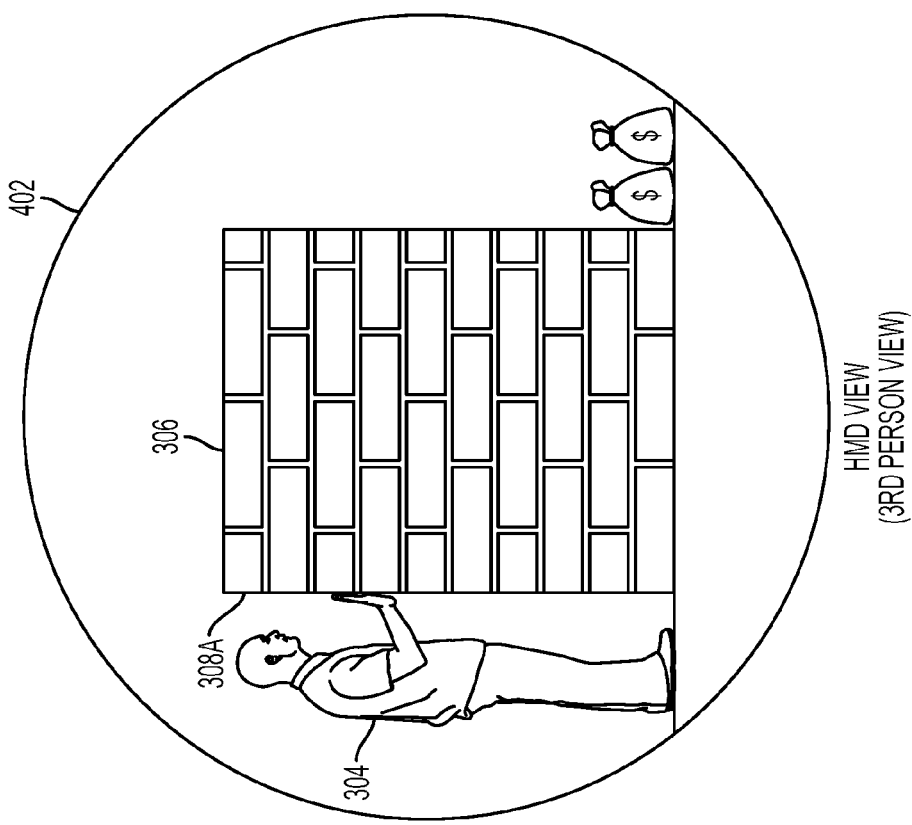
FIG. 4A is a diagram of an embodiment of a scene that is generated in a similar manner to that of the scenes of FIGS. 3A and 3B, in accordance with one embodiment of the present disclosure.

FIG. 4A is a diagram of an embodiment of a scene 402 that is generated in a similar manner to that of the scenes 302 and 310 (FIGS. 3A & 3B). The scene 402 is displayed from a third person's view and is displayed in the HMD 104 (FIG. 1). In addition, in FIG. 4A, the game processor 112 (FIG. 1) executes the interactive program and the IPU 122 (FIG. 1) executes the rendering program to display virtual money bags on the display device 120 (FIG. 1) of the HMD 104. The avatar 304 moves closer to the virtual wall 306 compared to a position of the avatar 304 from the virtual wall 306 in the scene 310 (FIG. 3B). For example, the user 110 (FIG. 1) moves his/her hands and/or his/her legs more compared to that moved for the avatar 304 to reach the spatial position in the scene 310. This further movement by the user 110 results in the avatar 304 reaching a spatial position at a distance from the surface 308 of the virtual wall 306 as illustrated in the scene 402.

The user 110 raises his/her hand to allow the avatar 304 to touch the surface 308. The image capturing device 109 (FIG. 1) captures an image of the user 110 raising his/her hand to generate image data, which is sent via the communication device 117 (FIG. 1) of the game console 106 (FIG. 1) to the game processor 112 (FIG. 1). The game processor 112 analyzes the image data to determine a spatial position of the hands of the user 110 as being raised, e.g., higher, exceeding a pre-determined threshold, etc., compared to a prior spatial position, e.g., preceding spatial position, etc., of the hands of the user 110 captured in a previously captured image, e.g., preceding image, etc., and executes the interactive program to generate image data representing the avatar 304 as touching the surface 308. The image data that is generated is sent via the communication device 116 and the communication device 126 (FIG. 1) of the HMD 104 for display as the avatar 304 as touching the surface 308 on the display device 120 (FIG. 1) of the HMD 104.

Moreover, in addition to sending the image data to the HMD 104 for display of the scene 402, the game processor 112 determines a spatial position of the RCD 102 (FIG. 1) with respect to the user 110 as being the same as a distance between the avatar 304 and the surface 308. For example, when there is no distance left between the hands of the avatar 304 and the surface 308, the game processor 112 determines that no distance is left in the real-world between the hands of the user 110 and the drone 202 (FIG. 2). The spatial position of the RCD 102 in the real-world is sent via the communication device 116 of the game console 106 and the communication device 134 (FIG. 1) of the RCD 102 to the processor 136 (FIG. 1) of the RCD 102. Upon receiving the spatial position of the RCD 102, the processor 136 controls the mechanical component 142 (FIG. 1) of the RCD 102 to achieve a spatial position of a contact surface of the RCD 102 as touching the user 110. For example, upon receiving the spatial position of the RCD 102, the processor 136 of the drone 202 (FIG. 2) controls the one or more propellers 204 (FIG. 2) to allow the contact surface 208A (FIG. 2) to touch the glove 108B (FIG. 2) worn by the user 110.

When the user 110 touches the RCD 102, e.g., the contact surface 208A, etc., either via the glove 108B or via his/her hand, the user 110 gets feedback from the RCD 102 about the touch. This provides a better experience to the user 110 in interacting with the interactive content. For example, the user 110 actually feels that he/she is touching a real-world wall when the avatar 304 touches the virtual wall 306.

FIG. 4B is a diagram of an embodiment of a scene 410 that is generated in a similar manner as that of generating the scene 402 (FIG. 4A). The scene 410 is from a standpoint of a first person, e.g., from a standpoint of the user 110 (FIG. 1), etc., and is displayed in the HMD 104 (FIG. 1). The scene 410 includes a surface 308 of the virtual wall 306 (FIG. 4A). As illustrated by a web-shaped effect 412, the surface 308 is affected when a hand 414 of the avatar 304 (FIG. 4A) touches the virtual wall 306. When the hand 414 of the avatar 304 touches the virtual wall 306, the user 110 touches a contact surface of the RCD 102 (FIG. 1). The web-shaped effect 412 is generated when the interactive program is executed by the game processor 112 (FIG. 1) of the game console 106 (FIG. 1) and the rendering program is executed by the IPU 122 (FIG. 1).

In some embodiments, instead of a web-shaped effect, described herein, any other shaped-effect, e.g., a ripple-shaped effect, a cloud-shaped effect, a wave-shaped effect, a rain-shaped effect, etc., is displayed in the HMD 104 when the user 110 touches an RCD.

FIG. 5A is a diagram of an embodiment of a scene 502 in which the avatar 304 is shaking hands with a virtual monster 504, e.g., a virtual robot, etc. The scene 502 provides a third person's view. The scene 502 is generated when the interactive program is executed by the game processor 112 (FIG. 1) of the game console 106 (FIG. 1) and the rendering program is executed by the IPU 122.

A spatial position of the avatar 304 in the scene 502 is generated based on hand and/or leg movement of the user 110 (FIG. 1). As the user 110 moves his/her legs and/or hands to exhibit a walking or a running motion, a spatial position of the user 110 is captured by the image capturing device 109. The spatial position of the user 110 is sent from the image capturing device 109 in a form of image data to the game processor 112 via the communication device 117 (FIG. 1) of the game console 106. The image data that represents the spatial position of the user 110 is analyzed, e.g., compared to a spatial position of the user 110 represented in preceding image data, etc., to determine a change in a spatial position of the user 110 with respect to the virtual monster 504. The virtual monster 504 has the same spatial position in the virtual game when the image data and the preceding image data is received by the game processor 112 from the image capturing device 109. In some embodiments, the virtual monster 504 has different spatial positions in the virtual game when the image data and the preceding image data is received by the game processor 112 from the image capturing device 109.

The game processor 112 also determines based on the image data received from the image capturing device 109 whether the spatial position of the user 110 has changed to an extent that the avatar 304 touches the virtual monster 504. For example, the game processor 112 determines whether there is no distance left between the avatar 304 and the virtual monster 504. As another example, the game processor 112 determines that an image of the virtual monster 504 when displayed on the one or more display screens of the HMD 104 will occupy the same pixel as that occupied by the avatar 304 in the HMD 104.

Upon determining that the spatial position of the user 110 has changed so that the avatar 304 touches the virtual monster 504 during execution of the interactive program, the game processor 112 determines a corresponding spatial position of the RCD 102 (FIG. 1) to touch the user 110. For example, the game processor 112 sends the spatial position to the RCD 102 for the processor 136 (FIG. 1) of the RCD 102 to control the mechanical component 142 and/or other mechanical components of the RCD 102 to allow the contact surface 208A (FIG. 2) to touch the glove 108B (FIG. 2).

FIG. 5B is a diagram of an embodiment of a scene 510 that is generated on the display device 120 (FIG. 1) of the HMD 104 (FIG. 1) from image data that is sent from the game processor 112 (FIG. 1) of the game console 106 (FIG. 1) via the communication devices 116 and 126 (FIG. 1) to the IPU 122 (FIG. 1) of the HMD 104. The scene 510 is displayed from the standpoint of a first person's view. As shown, user 110 is able to see the virtual monster 504 face-to-face on the one or more display screens of the HMD 104 in the first person's view. In the scene 510, the hand 414 of the avatar 304 (FIG. 5A) touches a virtual hand 512 of the virtual monster 504.

Figure 6:
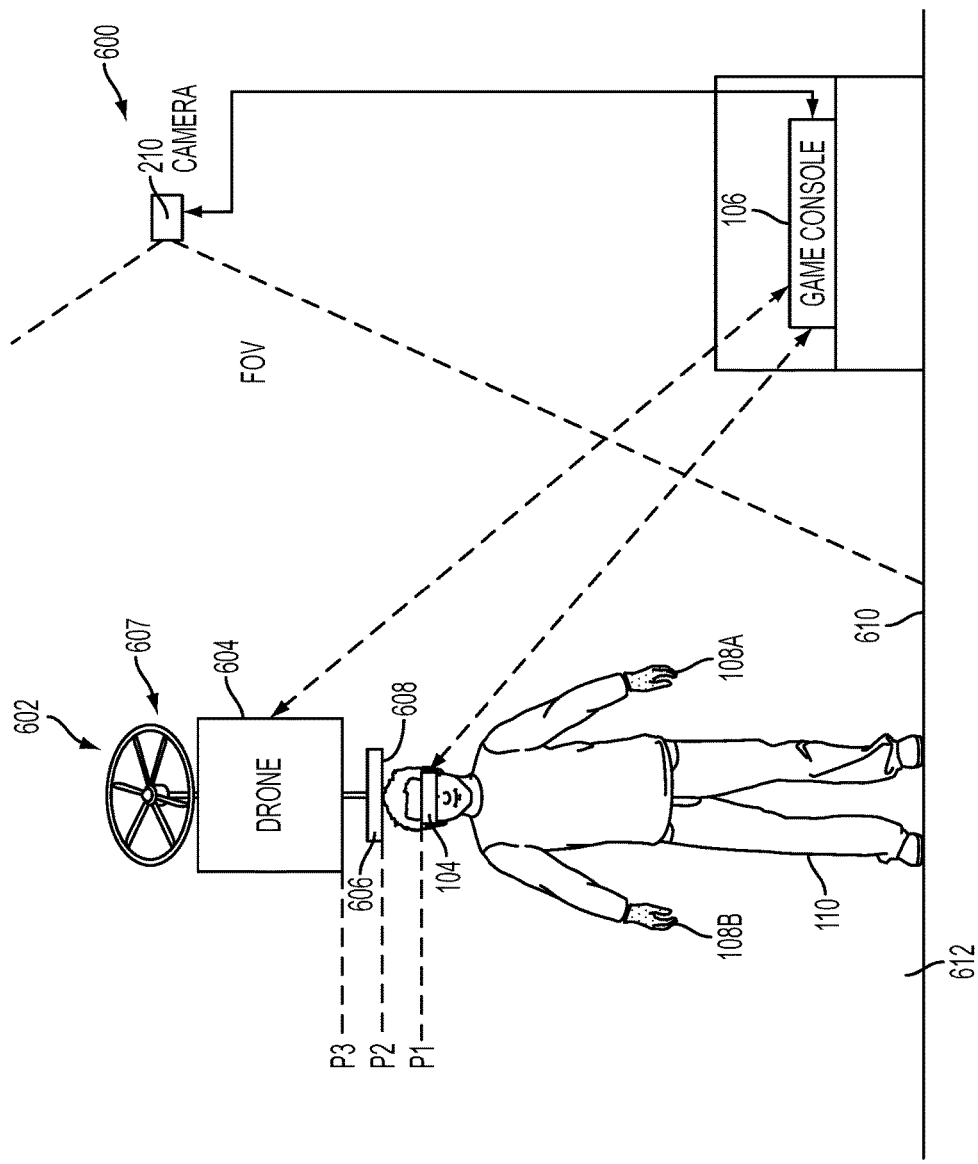
FIG. 6 is a diagram of a system for illustrating a drone about to touch a head of the user, in accordance with one embodiment of the present disclosure.

FIG. 6 is a diagram of an embodiment of a system 600 for illustrating a drone 602 about to touch a head of the user 110. The drone 602 has a body 604, e.g., a housing, a cage, an enclosure, a housing enclosure, etc., and one or more propellers 607. The drone 602 has a contact object 606 that is attached to a bottom surface of the housing 604. The contact object 606 has a contact surface 608. The drone 602 is similar to the drone 202 (FIG. 2) and the contact object 606 is similar to the contact object 206A or the contact object 206B (FIG. 2). The drone 602 is an example of the RCD 102 (FIG. 1).

The user 110 is playing a game of soccer using the HMD 104 and the game console 106 (FIG. 1). The soccer game is an example of the virtual game. During the play of the soccer game that is displayed on the one or more display screens of the HMD 104, the user 110 jumps over a floor 610 of a room 612.

A spatial position of the head of the user 110 changes from a spatial position P1 to a spatial position P2 as the user 110 jumps to hit a virtual soccer ball displayed in the soccer game. As the spatial position of the head changes, the camera 210 captures an image of the spatial position P2. The image data representing the spatial position P2 is sent from the camera 210 via the communication device 117 (FIG. 1) of the game console 106 to the game processor 112 (FIG. 1) of the game console 106.

The game processor 112 determines based a representation of the spatial position P2 in the image data that a spatial position of a virtual head of the user 110 that is displayed on the one or more display screens of the HMD 104 touches the virtual soccer ball. For example, the game processor 112 determines that the spatial position of the virtual soccer ball and a spatial position of the virtual head of the user 110 will occupy the same pixel on the one or more display screens of the HMD 104.

Upon determining that the spatial position of the virtual head of the user 110 touches, e.g., in the next video frame, etc., the virtual soccer ball, the game processor 112 sends a spatial position of the drone 602 to the drone 602. The drone 602 is controlled, e.g., via the one or more propellers 607, etc., by the processor 136 (FIG. 1) to change its spatial position from a spatial position P3 to the spatial position P2 to allow the surface 608 of the contact object 606 to touch the head of the user 110. As shown, the spatial position P3 is above the spatial position P2 and the spatial position P2 is above the spatial position P1.

In some embodiments, instead of changing the spatial position of the drone 602 from the spatial position P3, it should be noted that the spatial position of the drone 602 is changed from another spatial position, e.g., a spatial position at a charging station, a spatial position further away from the spatial position P2 compared to the spatial position P3, etc.

Figure 7:
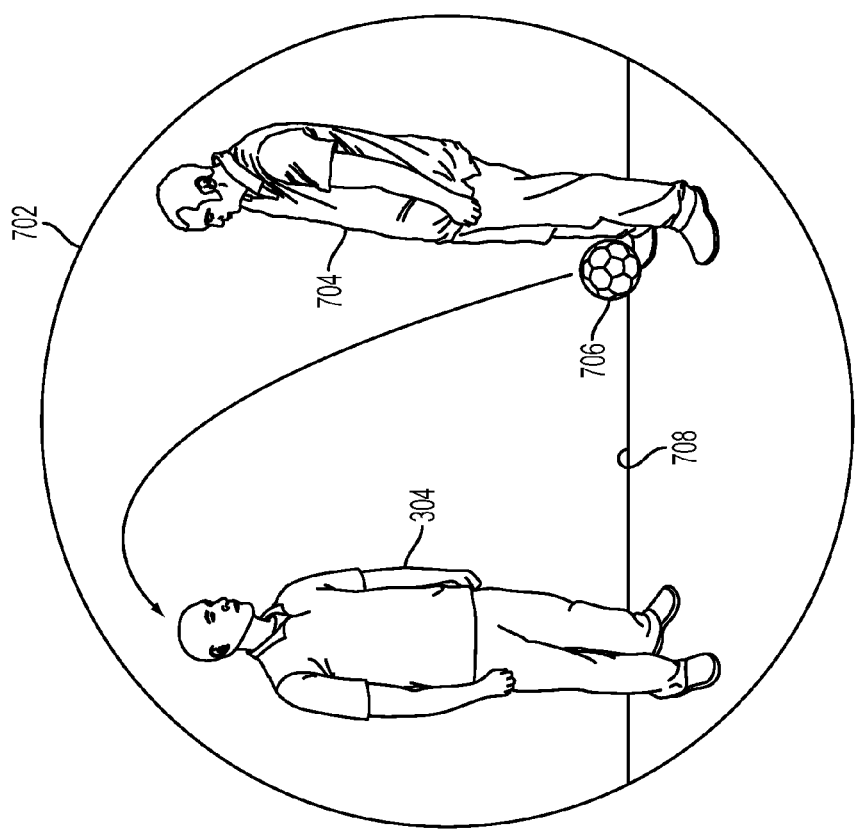
FIG. 7 is a diagram of a scene that is displayed in the HMD, in accordance with one embodiment of the present disclosure.

FIG. 7 is a diagram of an embodiment of a scene 702 that is displayed on the display device 104 (FIG. 1) of the HMD 104. The scene 702 is from a third person's view and is displayed on the one or more display screens of the HMD 104 (FIG. 1) when the interactive program is executed by the game processor 121 (FIG. 1) of the game console 106 (FIG. 1). In the scene 702, an avatar 704 is about to kick a virtual soccer ball 706 off a virtual ground 708 of a virtual soccer field. In some embodiments, the avatar 704 is about to kick a virtual soccer ball 706 when the user 110 is about to exhibit a kicking motion to the camera 210 (FIG. 6). The avatar 704 is playing the virtual soccer game with the avatar 304. For example, both the avatar 304 and the avatar 704 belong the same team or opposite teams.

Figure 8:
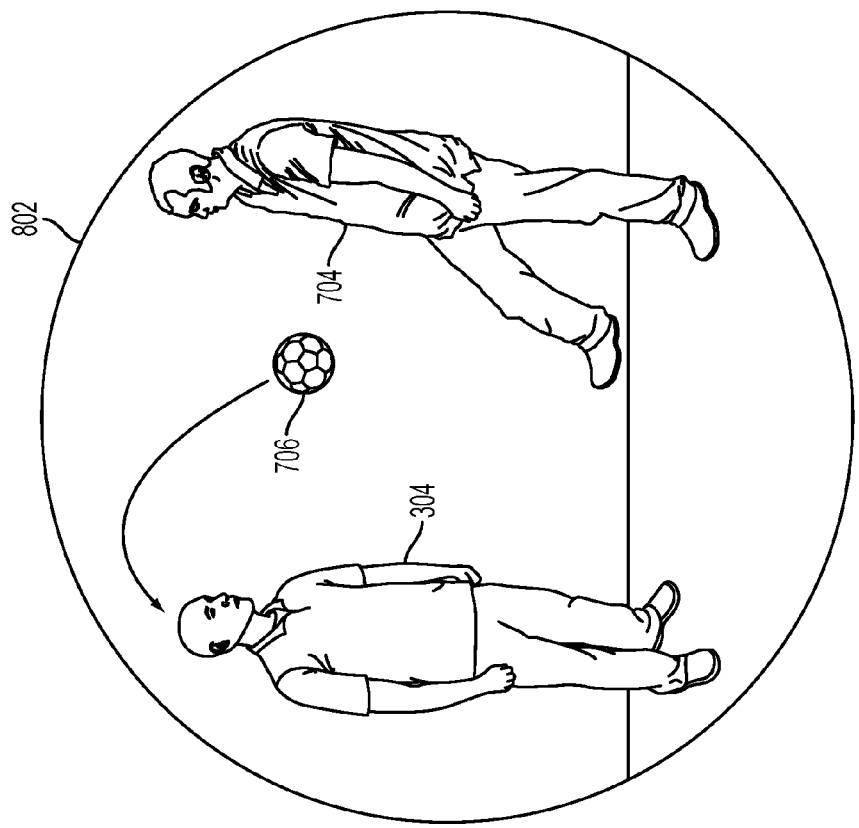
FIG. 8 is a diagram of a scene that is displayed in the HMD, in accordance with one embodiment of the present disclosure.

FIG. 8 is a diagram of an embodiment of a scene 802 that is displayed on the one or more display screens of the HMD 104 (FIG. 1). The scene 802 is generated in a similar manner as that of generation of the scene 702 (FIG. 7). For example, the scene 802 is generated based on a video frame that follows a video frame that is used to generate the scene 702. Each scene is generated by the IPU 122 (FIG. 1) of the HMD 104 based on image data that is received from the game processor 112 (FIG. 1) of the game console 106 (FIG. 1). The virtual soccer ball 706 is closer to the virtual head of the avatar 302 than a spatial position of the virtual soccer ball in the scene 702. The virtual soccer ball 706 is about to land on the virtual head of the avatar 304. For example, the user 110 performs an action, e.g., moves his/her head and/or jumps, etc., to change a spatial position of his/her head. The action is captured by the camera 210 (FIG. 6) to generate image data, which is sent via the communication device 117 (FIG. 1) of the game console 106 to the game processor 112 (FIG. 1) of the game console 106. The game processor 112 executes the interactive program to determine a corresponding spatial position of a virtual head of the avatar 304 from the spatial position of the head of the user 110. The game processor 112 sends the spatial position of the avatar 304 to the IPU 122 via the communication devices 116 and 126 (FIG. 1). The IPU 122 displays the avatar 304 as having the corresponding spatial position in the scene 802.

Figure 9B:
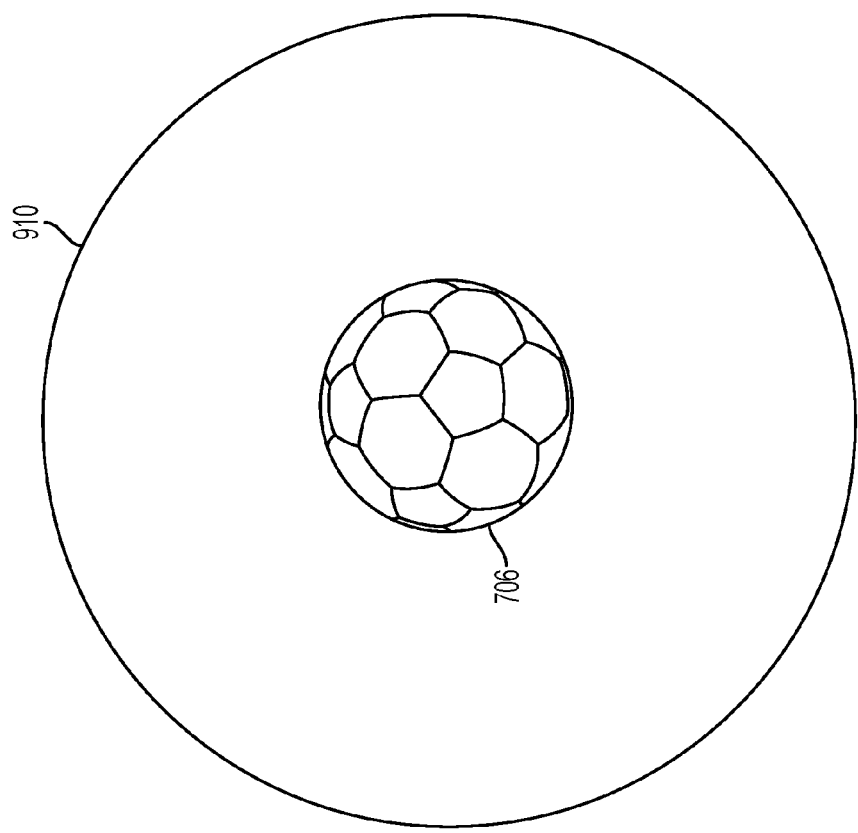
FIG. 9B is a diagram of a scene that is similar to the scene of FIG. 9A except being from a first person's view, in accordance with one embodiment of the present disclosure.
Figure 9A:
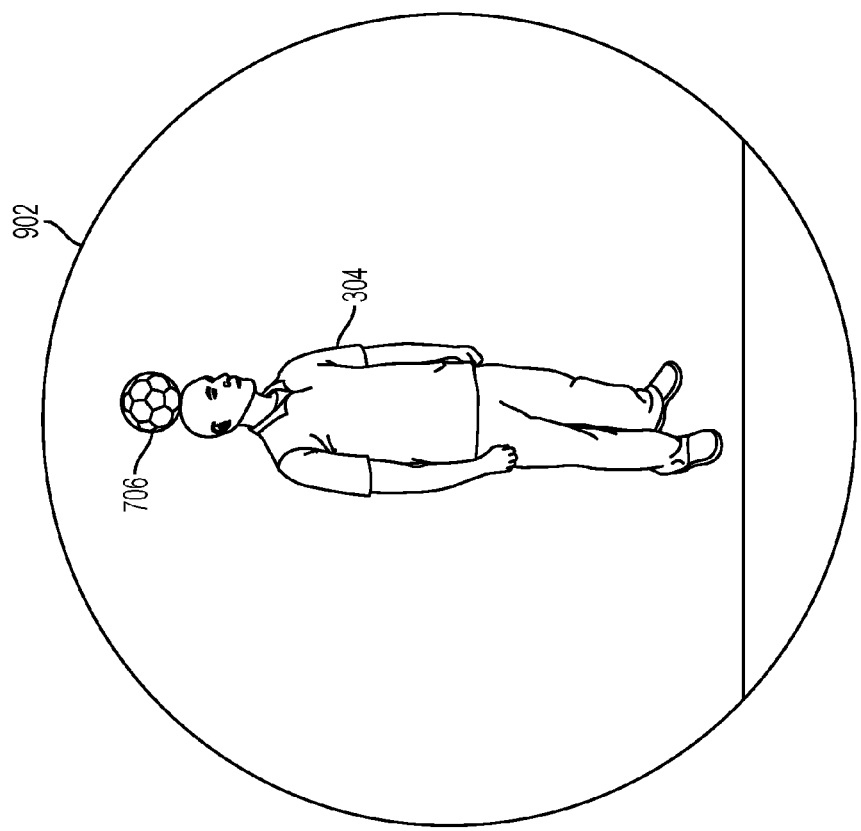
FIG. 9A is a diagram of a scene that is displayed in a third person view in the HMD while the user is using his/her head to play a virtual game, in accordance with one embodiment of the present disclosure.

FIG. 9A is a diagram of an embodiment of a scene 902 that is displayed in a third person view, e.g., from a standpoint of a bystander, etc., of a third person who is watching the user 110. As shown in the scene 902, the virtual soccer ball 902 touches the virtual head of the avatar 304. The scene 902 is generated in a manner similar to that of generation of the scene 802 (FIG. 8). For example, the scene 902 is generated by the IPU 122 (FIG. 1) based on a video frame that follows a video frame used to generate the scene 802. The scene 902 is displayed on the one or more display screens of the HMD 104 (FIG. 1) based on image data that is received from the game console 106 (FIG. 1). In the scene, the virtual soccer ball 706 touches the virtual head of the avatar 304.

FIG. 9B is a diagram of an embodiment of a scene 910 that is generated on the one or more display screens of the HMD 104 (FIG. 1). The scene 901 is displayed from a first person view, e.g., from a standpoint of the user 110 (FIG. 1), etc., and is generated in a manner similar to that of generation of the scene 902 (FIG. 9A). The scene 910 includes the virtual soccer ball 706 that is bouncing in a virtual space.

FIG. 10 is a diagram of an embodiment of a system 1000 in which a robotic arm 1002 is used to provide the user 110 with a better experience while interacting with a scene displayed within the HMD 104. The robotic arm 1002 is an example of the RCD 102 (FIG. 1).

The user 110 is interacting with a scene that is displayed on the one or more display screens of the HMD 104. For example, the user 110 is playing a virtual kung fu game, or a virtual soccer game, or a virtual martial arts game, or any other virtual game. During the execution of the interactive program, the game processor 112 sends the interactive data, which, for example, is generated from image data regarding a spatial position of the legs of the user 110, via the communication device 116 (FIG. 1) of the game console 106 and the communication device 126 (FIG. 1) of the HMD 104, to the IPU 122 (FIG. 1) of the HMD 104. The IPU 122 renders the interactive data received from the game processor 112 to generate an image of a scene on the display device 120 (FIG. 1) of the HMD 104.

As the user 110 moves his/her legs during interaction with the interactive program, e.g., during a play of the virtual game, while viewing an AR scene, while viewing a virtual reality scene, etc., in the HMD 104, a change in a spatial position of the legs of the user 110 occurs. The change in the spatial position of the legs is monitored by the camera 210. When the user 110, via movement of his/her legs, hits a virtual world object, e.g., a virtual object, an AR object, etc., in a scene displayed in the HMD 104, the game processor 112 sends a spatial position of the robotic arm 1002 via the communication device 116 and the communication device 134 (FIG. 1) of the RCD 102 to the processor 136 (FIG. 1) of the RCD 102. The processor 136 controls the robotic arm 1002 to allow the robotic arm 1002 to touch the legs of the user 110. When the robot arm 1002 touches the legs of the user 110, the user 110 feels as if the user 110 is playing a game in the real-world instead of on the HMD 104.

The robotic arm 1002 is attached to a table 1004. For example, the robotic arm 1004 is attached via an attachment mechanism, e.g., via screws, nuts, bolts, glue, nails etc., to a surface of the table 1004. In some embodiments, the robotic arm 1002 is attached to a surface of another real-world object, e.g., a floor, a wall, a ceiling, a staircase, a support, a chair, etc. In various embodiments, instead of being attached to a real-world object, the robot arm 1004 is a part of a robot that is remotely-controlled. For example, the robot is movable on tracks, or wheels, or other movement mechanism.

It should be noted that in some embodiments, the touch of the robotic arm 1002 prevents the user 110 from an accident.

For example, when the robotic arm 1002 is connected to a staircase, the robotic arm 1002 touches the leg of the user 110 who is about to roll down the staircase while interacting with the interactive content. The user 110 cannot see the staircase when the user 110 is wearing the HMD 104.

Figure 11:
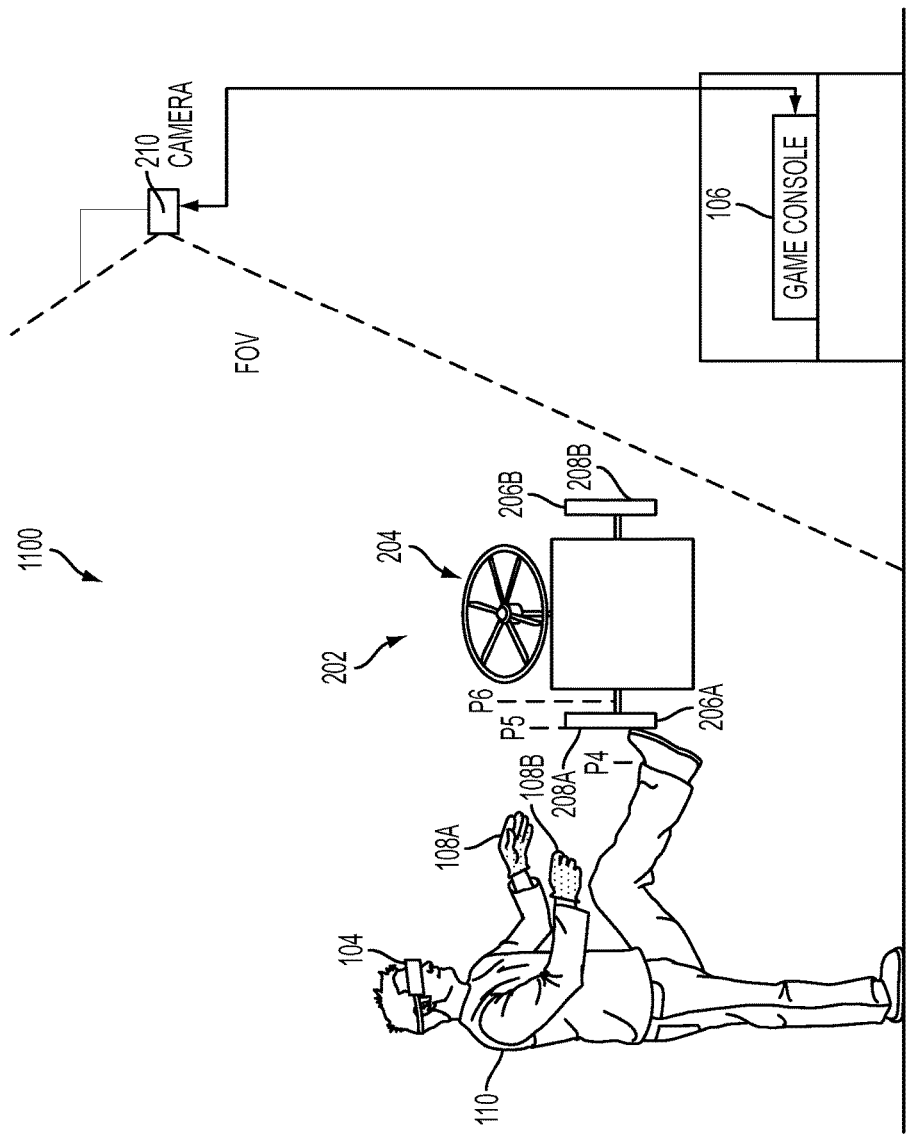
FIG. 11 is a diagram of a system in which the user makes contact with a surface of a contact object via his/her foot, in accordance with one embodiment of the present disclosure.

FIG. 11 is a diagram of an embodiment of a system 1100 in which the user 110 makes contact with the surface 208A of the contact object 206A via his/her foot. For example, the user 110 is playing a martial arts game, e.g., a karate game, a kung fu game, etc., on the HMD 104. The martial arts game is an example of the virtual game. The martial arts game is generated when the game processor 112 (FIG. 1) of the game console 106 sends image data via the communication device 116 (FIG. 1) of the game console 106 and the communication device 126 (FIG. 1) of the HMD 104 to the IPU 122 (FIG. 1) for display on the display device 120 (FIG. 1) of the HMD 104.

During the play of the martial arts game, a foot of the user 110 contacts the surface 208A at a time a virtual foot of an avatar of the user 110 comes in contact with a virtual body part of a virtual opponent in the martial arts game. For example, the user 110 moves his/her foot from a spatial position P4 to a spatial position P5, which is a spatial position of the surface 208A of the contact object 206A. When the foot reaches the spatial position P5, the foot of the user 110 comes in contact with the surface 208A.

Moreover, when the foot is at the spatial position P4, the contact surface 208A is at a spatial position P6 or at another spatial position, e.g., a spatial position on a charging station, a position further away than the spatial position P6 as compared to a reference point, e.g., a reference co-ordinate of the real-world environment, an origin (0,0,0) of a co-ordinate of the real-world environment, etc., or as compared to the spatial position P5, a position towards the spatial position P5 compared to the spatial position P6, etc. The camera 210 captures image data indicating that the foot has reached the spatial position P5. The image data indicating the spatial position P5 of the foot is sent via the communication device 117 (FIG. 1) of the game console 106 to the game processor 112 (FIG. 1) of the game console 106. The game processor 112 parses the image data to determine that the foot is at the spatial position P5. Upon determining that the spatial position of the foot is at P5 and upon determining that an avatar controlled by the user 110 is kicking another avatar in the martial arts game, the game processor 112 sends the spatial position P5 to the drone 202. The processor 136 (FIG. 1) of the drone 202 controls the one or more propellers 204 to facilitate the surface 208A to achieve the spatial position P5 to allow the foot to come in contact with the surface 208A.

In some embodiments, the user 110 wears a foot accessory, e.g., a shoe glove, a shoe accessory, a foot glove, a marker, a light emitter, a shoe, a shoe marker, a shoe light emitter, one or more LEDs, etc., on his/her foot while interacting with the interactive program via his/her feet. The foot accessory is worn instead of or in addition to the gloves 108A and 108B, which are worn on the hands of the user 110. The foot accessory is imaged via the camera 210 to determine a spatial position of the foot of the user 110 in the real-world environment.

In various embodiments, the foot accessory includes inertial sensors, e.g., gyroscopes, accelerometers, magnetometers, etc., which sense a position and/or an orientation of a foot of the user and communicates the position and/or the orientation to the game processor 112 (FIG. 1) via the communication device 116. In some embodiments, the inertial sensors of the foot accelerator are used instead of or in addition to using the camera 210 to determine a spatial position of the foot of the user 110.

Figure 12:
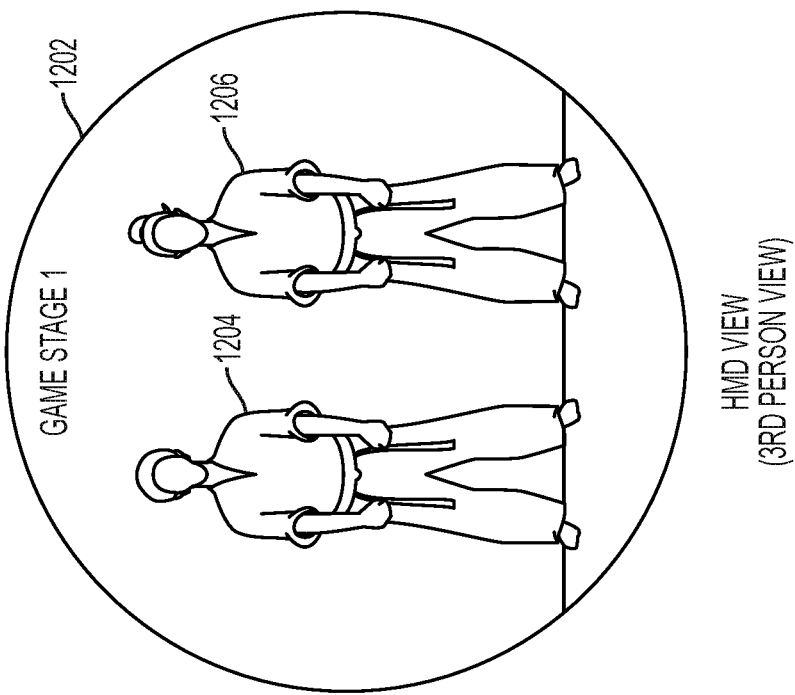
FIG. 12 is a diagram of a scene in which an avatar controlled by the user via his/her controller exhibits martial arts against its virtual opponent, in accordance with one embodiment of the present disclosure.

FIG. 12 is a diagram of an embodiment of a scene 1202 in which an avatar 1204 controlled by the user 110 via his/her controller 108 (FIG. 1) exhibits martial arts against its virtual opponent, which is also an avatar 1206. The scene 1202 is from the standpoint of a third person. The avatar 1206 represents another user, who is playing the martial arts game with the user 110 via the computer network. For example, the other user and the user 110 access the computer network and a virtual network, e.g., a social network user account, an email user account, a game network user account, etc., to access the martial arts game from a server or a virtual machine (VM). The other user and the user 110 provide their respective authentication information, e.g., user name, password, etc., to the virtual network. When the authentication information is authentication by the virtual network, the user 110 and the other user access the martial arts game in the virtual network. Once the martial game is accessed, the other user selects the avatar 1206 from a group of avatars available for the martial arts game and the user 110 selects the avatar 1204 from the group of avatars.

In some embodiments, instead of representing the other user, the avatar 1206 represents the game console 106 (FIG. 1) that executes the interactive program, etc. For example, movements of the avatar 1206 are controlled by the game processor 112 (FIG. 1) instead of by the other user.

Figure 13:
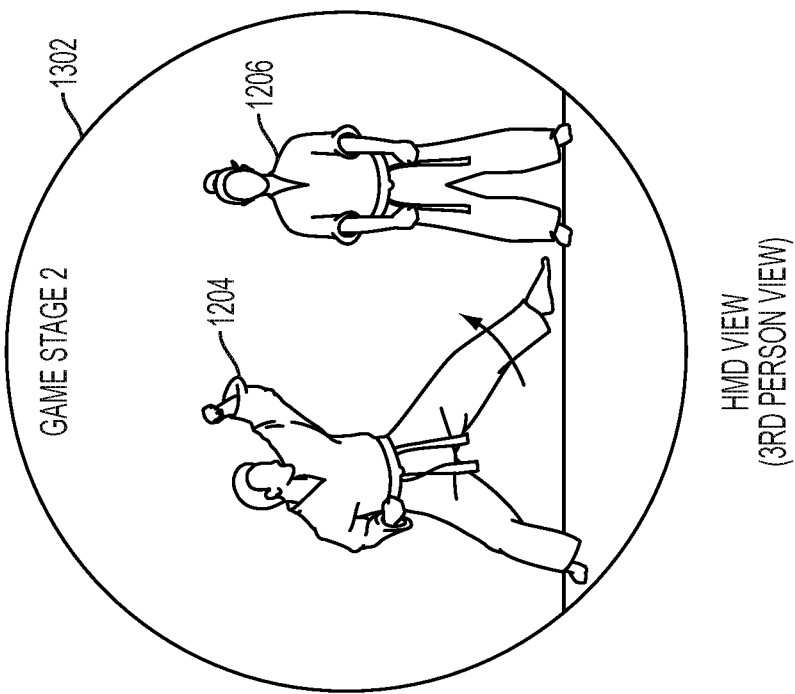
FIG. 13 is a diagram of a scene that is displayed after the scene of FIG. 12 is displayed in the HMD during a martial arts game, in accordance with one embodiment of the present disclosure.

FIG. 13 is a diagram of an embodiment of a scene 1302 that is generated on the display device 120 (FIG. 1) of the HMD 104 after generation of the scene 1202 on the display device 120 during display of the martial arts game. The scene 1302 is from the standpoint of a third person and is generated in a manner similar to that of generation of the scene 1202 (FIG. 12). For example, the scene 1302 is rendered by the IPU 122 (FIG. 1) from a video frame that is next to a video frame that is used to render the scene 1202. In the scene 1302, the avatar 1204 is about to kick the avatar 1206. For example, the user 110 lifts his/her foot so that the avatar 1204 is about to kick the avatar 1206. The lifting of the foot is captured by the camera 210 and sent as image data via the communication device 117 (FIG. 1) to the game processor 112. The game processor 112 executes the interactive program to generate the interactive data that is based on the image data indicating the lifting of the foot. The interactive data is communicated via the communication devices 116 and 126 (FIG. 1) to the IPU 122 for rendering in the HMD 104.

Figure 14B:
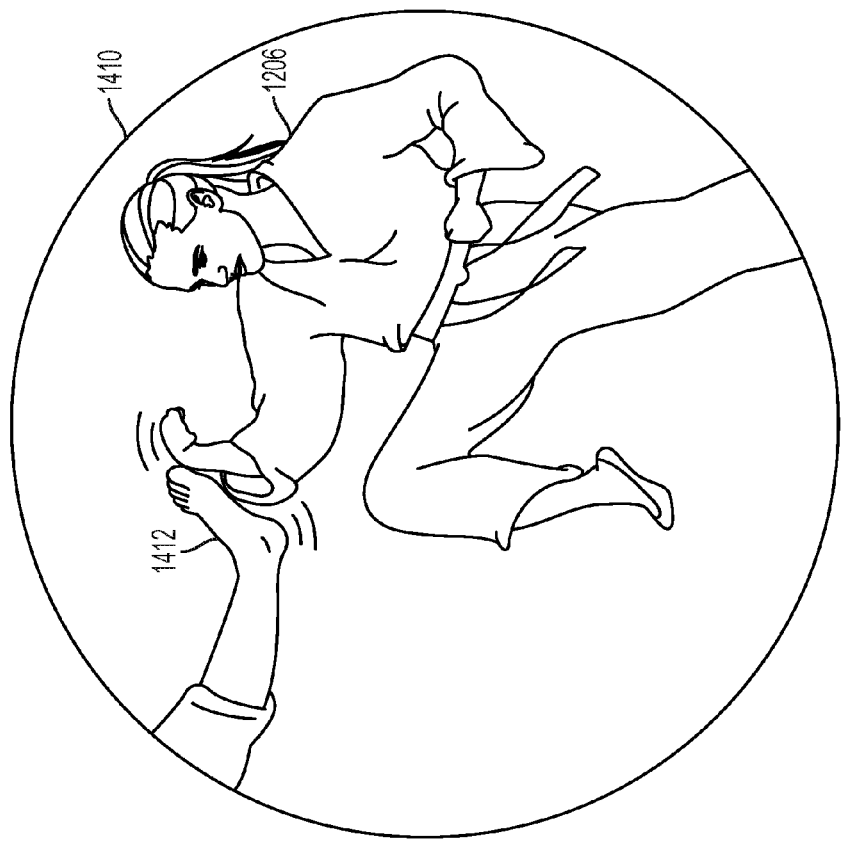
FIG. 14B is a diagram of a scene that is similar to the scene of FIG. 14A except being from a first person's view, in accordance with one embodiment of the present disclosure.
Figure 14A:
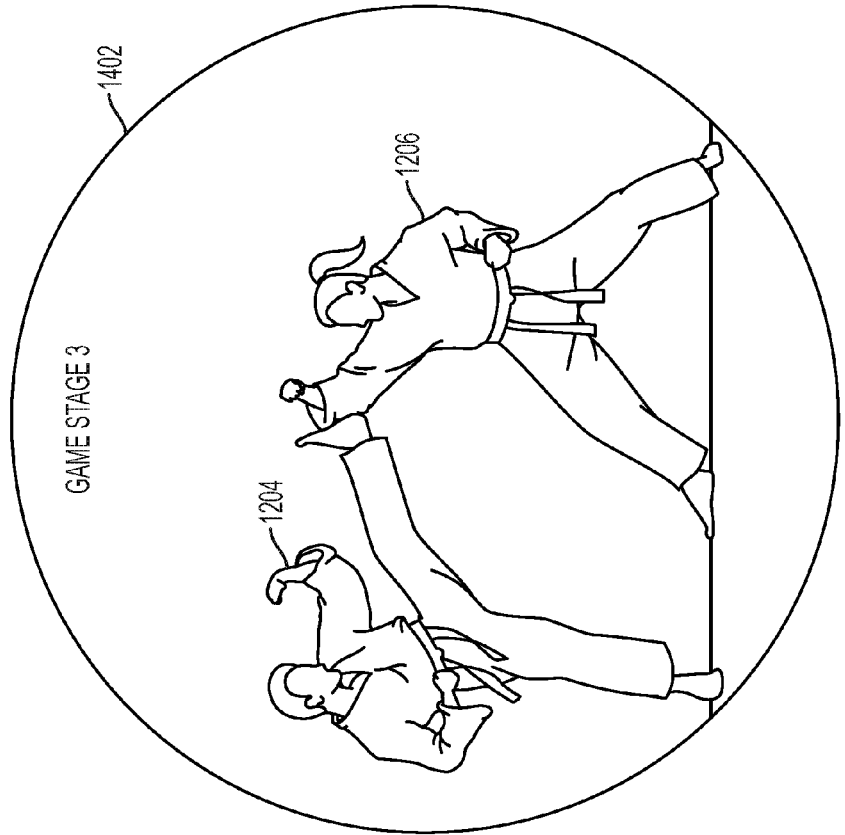
FIG. 14A is a diagram of a scene in which an avatar of the user kicks an avatar of another user, in accordance with one embodiment of the present disclosure.

FIG. 14A is a diagram of an embodiment of a scene 1402 in which the avatar 1204 of the user 110 kicks the avatar 1206 of the other user. The scene 1402 is from the standpoint of a third person. The scene 1402 is generated by the IPU 122 (FIG. 1) of the HMD 104 (FIG. 1) in a manner similar to generation of the scene 1302 (FIG. 13). For example, the scene 1402 is generated from a video frame that follows a video frame used to generate the scene 1302. In the scene 1402, there is contact between a virtual foot of the avatar 1204 and a virtual hand of the avatar 1206.

FIG. 14B is a diagram of an embodiment of a scene 1410 in which the avatar 1204 kicks the avatar 1206. The scene 1410 is generated from the standpoint of the user 110, which is from a first person's view. The scene 1410 is generated in a manner similar to that of generation of the scene 1402 (FIG. 14A) by the IPU 122 (FIG. 1). The scene 1410 is displayed on the display device 120 (FIG. 1) of the HMD 104. The user 110 lifts his foot to achieve the spatial position P5 (FIG. 11). When the foot is at the spatial position P5, a virtual foot 1415 of the avatar 1204 (FIG. 14A) kicks the avatar 1206. Moreover, when the foot is at the spatial position P5, the game processor 112 controls the drone 1202 (FIG. 11) to facilitate the surface 208A of the contact object 206A (FIG. 11) to achieve the spatial position P5. When the surface 208A is at the spatial position P5, the foot of the user 110 contacts the surface 208A to provide the user 110 an experience of real-world martial arts during the play of the virtual martial arts game.

Figure 15:
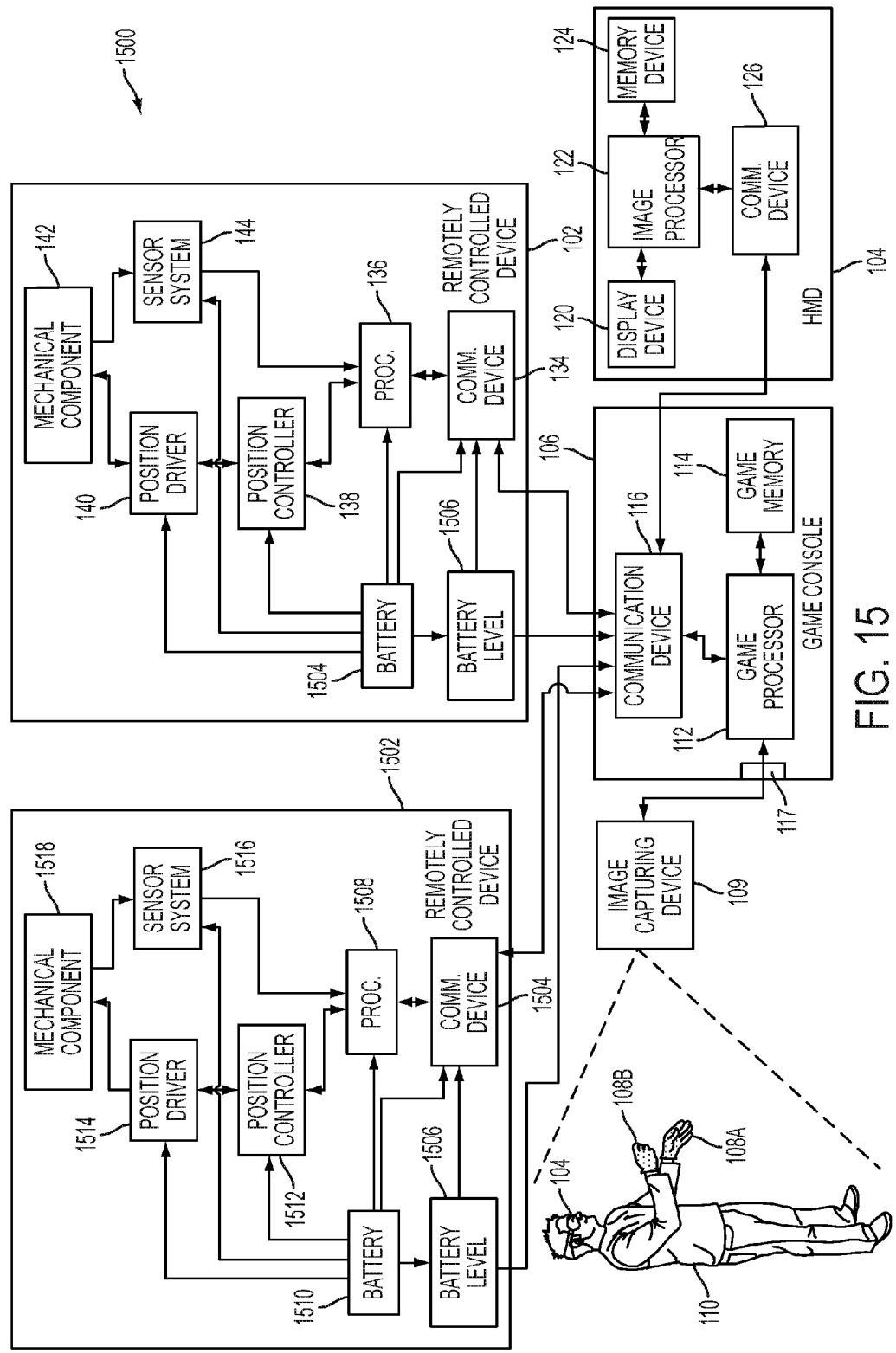
FIG. 15 is a diagram of a system for using RCDs based on charges stored on the RCDs, in accordance with one embodiment of the present disclosure.

FIG. 15 is a diagram of an embodiment of a system 1500 for controlling RCDs 102 and 1502 based on charges stored on the RCDs 102 and 1502. The RCD 102 includes a battery 1504 and a battery level indicator 1506. Examples of the battery 1504 include a nickel-metal hydride battery, a nickel-cadmium cell, a lithium-ion cell, a rechargeable battery, a non-rechargeable battery, a battery pack, etc. Examples of the battery level indicator 1506 include a battery indicator, a voltmeter, a battery condition meter, an ammeter, etc.

The battery 1504 provides power to the position driver 140, the sensor system 144, the position controller 138, the processor 136, the communication device 136, and the battery level indicator 1506. In some embodiments, another battery provides power to the battery level indicator 1506. In various embodiments, different batteries are used to provide power to different components of the RCD 102. For example, the battery 1504 provides power to the position controller 138 and another battery provides power to the sensor system 144. The battery level indicator 1506 measures a parameter, e.g., voltage, current, etc., of the battery, and sends the parameter via the communication device 134 of the RCD 102 and the communication device 116 of the game console 106 to the game processor 112.

The RCD 1502 includes a communication device 1505, a battery level indicator 1507, a processor 1508, a battery 1510, a position controller 1512, a position driver 1514, a sensor system 1516, and a mechanical component 1518. The RCD 1502 is similar to the RCD 102. For example, the RCD 1502 is a drone or a remotely-controlled robot. Moreover, the battery level indicator 1507 is similar to the battery level indicator 1506, the communication device 1505 is similar to the communication device 134, the battery 1510 is similar to the battery 1504, the processor 1508 is similar to the processor 136, the position controller 1512 is similar to the position controller 138, the position driver 1514 is similar to the position driver 140, the sensor system 1516 is similar to the sensor system 144, and the mechanical component 1518 is similar to the mechanical component 142.

The game processor 112 determines whether the parameter received from the RCD 102 is less than a pre-determined threshold, which is stored in the game memory 114. Upon determining that the parameter received from the RCD 102 is less than the pre-determined threshold, the game processor 112 sends a signal to the processor 136 via the communication device 116 and the communication device 134. The signal indicates a real-world spatial position of the RCD 102 to be achieved and the real-world spatial position is that of a charging station (not shown).

A charging station, as used herein, is used to charge a battery of an RCD. A charging station is a direct current (DC) charging station or an alternating current (AC) charging station.

Upon receiving the signal indicating the real-world spatial position of the RCD 102, the processor 136 sends the spatial position to the position controller 138. The position controller 138 determines a speed and/or acceleration of the mechanical component 142 and other mechanical components of the RCD 102, further determines an amount of current to be produced by the position driver 140 to achieve the speed and/or acceleration, and sends a signal indicating the amount of current to the position driver 140. In some embodiments, the speed and/or acceleration and/or the amount of current is determined by the position controller 138 based on a distance between a real-world spatial position of the RCD 102 and a charging station used to charge the battery 1504, and time taken to travel the distance. The distance between the real-world spatial position of the RCD 102 and the charging station used to charge the battery 1504 is provided by the game processor 112 via the communication devices 116 and 1134 to the processor 136, which sends the distance to the position controller 138. The distance between the real-world spatial position of the RCD 102 and the charging station used to charge the battery 1504 is determined by the game processor 112 based on image data of the RCD 102 and the charging station captured by the image capturing device 109 and a scaling between a co-ordinate system of the real-world environment and a co-ordinate system of images captured by the image capturing device 109. The signal indicating the amount of current is received by the position driver 140. The position driver 140 sends a current signal having the amount of current to the mechanical component 142 to move, e.g., rotate, translate, etc., the mechanical component 142 with the speed and/or acceleration to further achieve the spatial position of a charging station used to charge the RCD 102.

Within a pre-determined amount of time, e.g., same time, between 1 to 5 seconds, between 1 to 5 milliseconds, 1 to 5 microseconds, etc., of sending the signal indicating the spatial position to be achieved to charge the battery 1504, the game processor 112 sends a signal to the processor 1508 via the communication devices 116 and 1505. The signal sent to the processor 1508 indicates a spatial position of the RCD 1502 to be achieved. The spatial position of the RCD 1502 to be achieved is that of the RCD 102 before the RCD 102 is sent the signal indicating the spatial position to be achieved for charging the RCD 102. For example, the spatial position of the RCD 1502 to be achieved includes an x co-ordinate, a y co-ordinate, and a z co-ordinate from a real-world reference point, e.g., an origin (0,0,0), etc., within a room in which the user 110 is interacting with the HMD 104. As another example, the spatial position of the RCD 1502 to be achieved is a spatial position of the body part of the user 110, when a virtual representation of the body part in a scene is in contact with the virtual object. As yet another example, during a play of the virtual game, when the surface 208A of the RCD 102 is in contact with the glove 108B (FIG. 2), the spatial position of the RCD 1502 to be achieved is to be in contact with the glove 108B. As another example, during a play of the virtual game, when the surface 208A of the RCD 102 is a distance away from the glove 108B (FIG. 2), the spatial position of the RCD 1502 to be achieved is to be at the distance from the glove 108B.

The processor 1508 receives the spatial position of the RCD 1502 to be achieved, and sends the spatial position to the position controller 1512. The position controller 1512 determines a speed and/or acceleration of the RCD 1502 based on the spatial position to be achieved, further determines an amount of current to achieve the speed and/or acceleration, and sends the amount of current to the position driver 1514. The speed and/or acceleration facilitates achieving the spatial position of the RCD 1502 within a time period. For example, the speed and/or acceleration of the RCD 1502 is one that allows the RCD 1502 to reach a spatial position of the RCD 102 before a time at which the RCD 102 changes the spatial position from being in contact with the body part of the user 110 or the controller 108 to being at a charging station. As another example, the speed and/or acceleration of the RCD 1502 is one that allows the RCD 1502 to reach a spatial position of the RCD 102 at a time at which the RCD 102 changes the spatial position from being in contact with the body part of the user 110 or the controller 108 to being at a charging station. As another example, the speed and/or acceleration of the RCD 1502 is one that allows the RCD 1502 to reach within a pre-determined distance of a spatial position of the body part of the user 110 or the controller 108 before a time at which the RCD 102 changes its spatial position from being within the pre-determined distance to being at a charging station.

The position controller 1512 sends a signal to the position driver 1514 indicating the amount of current. Upon receiving the signal indicating the amount of current from the position controller 1512, the position driver 1514 sends a current signal having the amount of current to the mechanical component 1518 so that the mechanical component 1518 operates at the speed and/or acceleration to allow the RCD 1502 to achieve a spatial position.

By using a number of RCDs greater than one, e.g., two RCDs, three RCDs, four RCDs, etc., and by switching some of the RCDs for re-charging some of the remaining of the RCDs, the user 110 is able to interact with the interactive content for a longer period of time compared to when the RCDs are not being re-charged during interaction of the user 110 with the interactive content.

Figure 16:
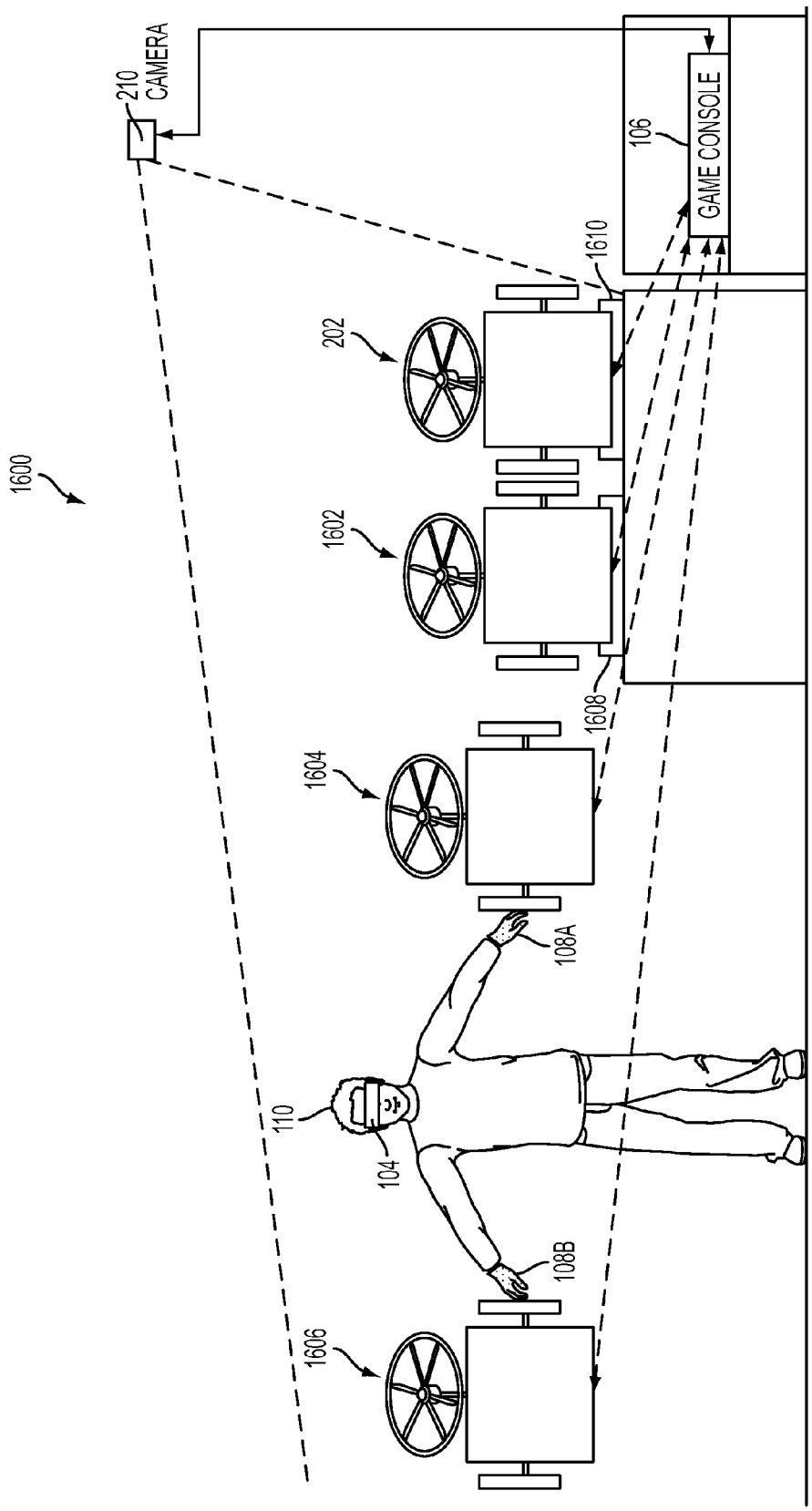
FIG. 16 is a diagram of a system for switching between drones based on battery levels of the drones, in accordance with one embodiment of the present disclosure.

FIG. 16 is a diagram of an embodiment of a system 1600 for switching between drones 202, 1602, 1604, and 1606 based on battery levels of the drones 202, 1602, 1604, and 1606. The system 1600 includes charging stations 1608 and 1610 for charging one or more of the drones 202, 1602, 1604, and 1606.

Charge levels, e.g., amount of charge, etc., of batteries of the drones 202, 1602, 1604, and 1606 is sent from the drones 202, 1602, 1604, and 1606 to the game console 106. The game console 106 determines to change spatial positions of the drones 202, 1602, 1604, and 1606 based on the charge levels. For example, when the drones 202 and 1602 have a level of charge less than a pre-determined level, the drones 202 and 1602 are controlled by the game console 106 to re-locate from being within a pre-determined distance from the user 110 to being at the charging stations 1610 and 1608. For example, the drone 202 is controlled to return to the charging station 1610 from a spatial position of being in contact with the glove 108A and the drone 1602 is controlled to return to the charging station 1608 from being in contact with the glove 108B.

The drones 1604 and 1606 that are being charged at the charging stations 1608 and 1610 while the drones 202 and 1602 are at a pre-determined distance from the user 110 are controlled to undock from, e.g., leave, etc., the charging stations 1608 and 1610 to reach the pre-determined distance. In some embodiments, the drones 1604 and 1606 are controlled to move away from the pre-determined distance from the user 110 to reach the charging stations 1610 and 1608 after the drones 202 and 1602 reach the pre-determined distance. Such switching of the drones 202, 1602, 1604, and 1606 provides the user 110 with an uninterrupted interaction with the interactive program. For example, the user 110 does not feel an interruption in the virtual game during switching of the drones 1604 and 1606 with the drones 202 and 1602.

It should be noted that although two charging stations are shown in FIG. 16, in some embodiments, any number of charging stations is used. For example, four charging stations, one for each drone 202, 1602, 1604, and 1606 is included in the system 1600. As another example, one charging station for all the drones 202, 1602, 1604, and 1606 is used.

In various embodiments, any number of drones instead of four drones 202, 1602, 1604, and 1608 are used in the system 1600. For example, three drones 202, 1602, and 1604 are used in the system 1600.

Figure 17B:
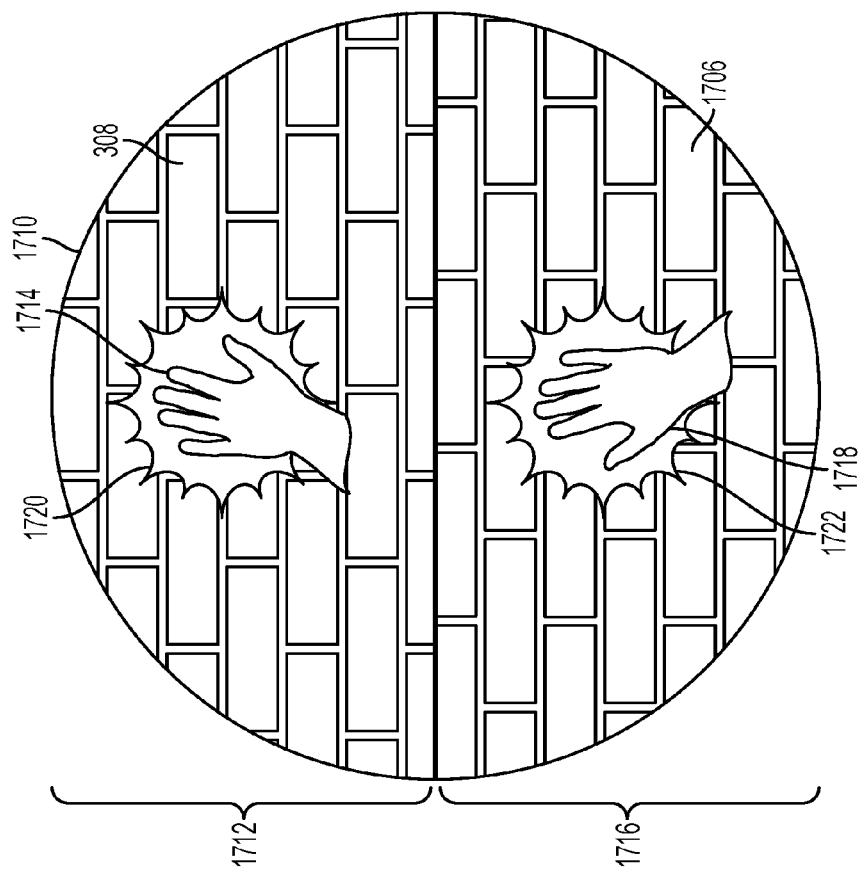
FIG. 17B is a diagram of a scene similar to the scene of FIG. 17A except being from a standpoint of a first person, in accordance with one embodiment of the present disclosure.
Figure 17A:
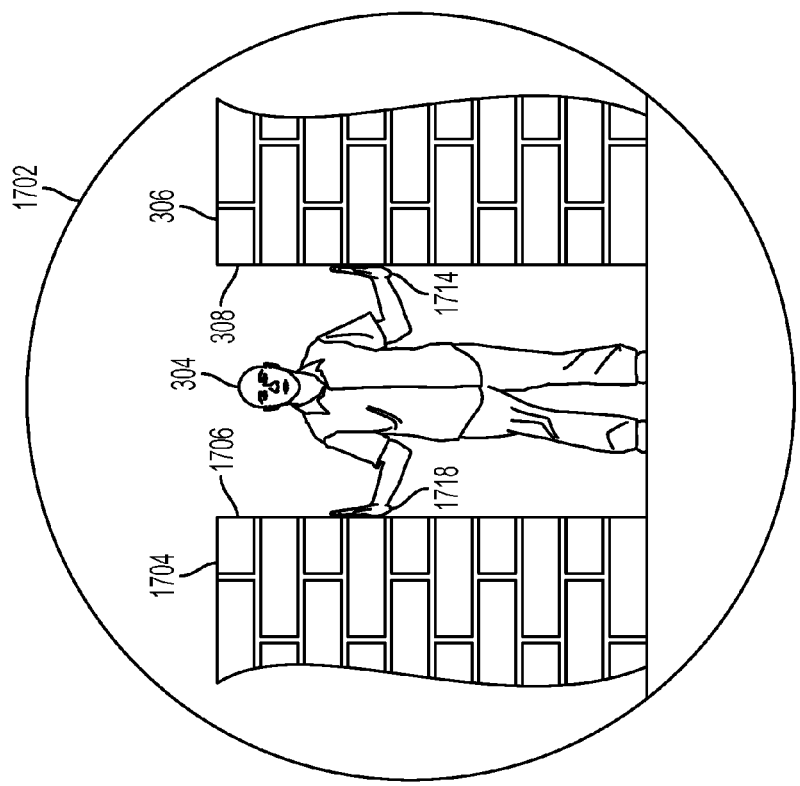
FIG. 17A is a diagram of a scene in which an avatar is trying to prevent two virtual walls from contracting against each other, in accordance with one embodiment of the present disclosure.

FIG. 17A is a diagram of an embodiment of a scene 1702 in which the avatar 304 is against two virtual walls 306 and 1704. The scene 1702 is from a standpoint of a third person. In the scene 1702, the avatar 304 is standing up against two virtual walls 306 and 1704 that are trying to close in on the avatar 304. The scene 1702 is displayed on the one or more display screens of the HMD 104 (FIG. 1).

At a time the avatar 304 is standing up against the virtual walls 306 and 1704, the glove 108A (FIG. 16) contacts a surface of a contact object of the drone 1604 (FIG. 16) and the glove 108B (FIG. 16) contacts a surface of a contact object of the drone 1606 (FIG. 16). For example, the game processor 112 (FIG. 1) determines that during a stage of the virtual game, a hand 1714 of the avatar 304 will contact the surface 308 of the virtual wall 306a and a hand 1718 of the avatar 304 will contact a surface 1706 of the virtual wall 1704. Upon determining so, the game processor 112 sends a signal indicating a spatial position of the drone 1606 to the processor 136 (FIG. 1) of the drone 1606 and sends another signal indicating a spatial position of the drone 1604 to the processor 1508 (FIG. 15) of the drone 1604. The processor 136 controls the drone 1606 to achieve the spatial position so that a contact surface of a contact object of the drone 1606 contacts the glove 108B. Moreover, the processor 1508 of the drone 1604 controls the drone 1604 to achieve the spatial position received from the game processor 112 so that a contact surface of a contact object of the drone 1604 contacts the glove 108A. Also, in some embodiments, the drones 1604 and 1606 apply pressure, e.g., push against, etc., on the gloves 108A and 108B so that the user 110 (FIG. 1) feels as if the user 110 is up against two real walls while interacting with the interactive program. This double contact with the two drones 1604 and 1606 immerses the user 110 further in the virtual world compared to that in case of the single contact with one RCD 102.

Also, in some embodiments, the double contact prevents the user 110 from getting into an accident in which on both sides of the user 110, there is a staircase or tables or chairs or sharp objects or a change in floor level in the real-world environment.

FIG. 17B is a diagram of an embodiment of a scene 1710 from a standpoint of a first person, e.g., the user 110 (FIG. 1). The scene 1710 is generated by the game processor 112 (FIG. 1) for display on the one or more display screens of the HMD 104 (FIG. 1). The scene 1710 includes two views, a top view 1712 showing the hand 1714 of the avatar 304 (FIG. 17B) touching the surface 308 and a bottom view 1716 showing the hand 1718 of the avatar 304 touching the surface 1706. As illustrated by a web-shaped effect 1720, the surface 308 is affected when the hand 1714 of the avatar 304 touches the virtual wall 306 and the surface 1706 is affected when the hand 1718 of the avatar 304 touches the virtual wall 1704 (FIG. 17A).

In various embodiments, instead of the avatar 304, a video image of the user 110 is displayed in the scenes of FIGS. 3A, 3B, 4A, 5A, 7, 8, 9A, 12, 13, 14A, and 17A. The video image is generated when the image capturing device 109 (FIG. 1) captures image data of the user 110 and transfers the image data via the communication device 117 (FIG. 1) of the game console 106 to the game processor 112 of the game console 106. The game processor 112 sends the image data via the communication device 116 (FIG. 1) and the communication device 126 of the HMD 104 to the IPU 122 for display of the video of the user 110 on the display device 12 (FIG. 1) of the HMD 104.

In some embodiments, instead of a body part of an avatar, a video image of the body part of the user 110 is displayed in the scenes of FIGS. 4B, 5B, 9B, 14B, and 17B. The video image is generated when the image capturing device 109 (FIG. 1) captures image data of the body part of the user 110 and transfers the image data via the communication device 117 of the game console 106 to the game processor 112 of the game console 106. The game processor 112 sends the image data via the communication device 116 and the communication device 126 of the HMD 104 to the IPU 122 for display of the video of the body part of the user 110 on the display device 12 (FIG. 1) of the HMD 104.

Figure 18:
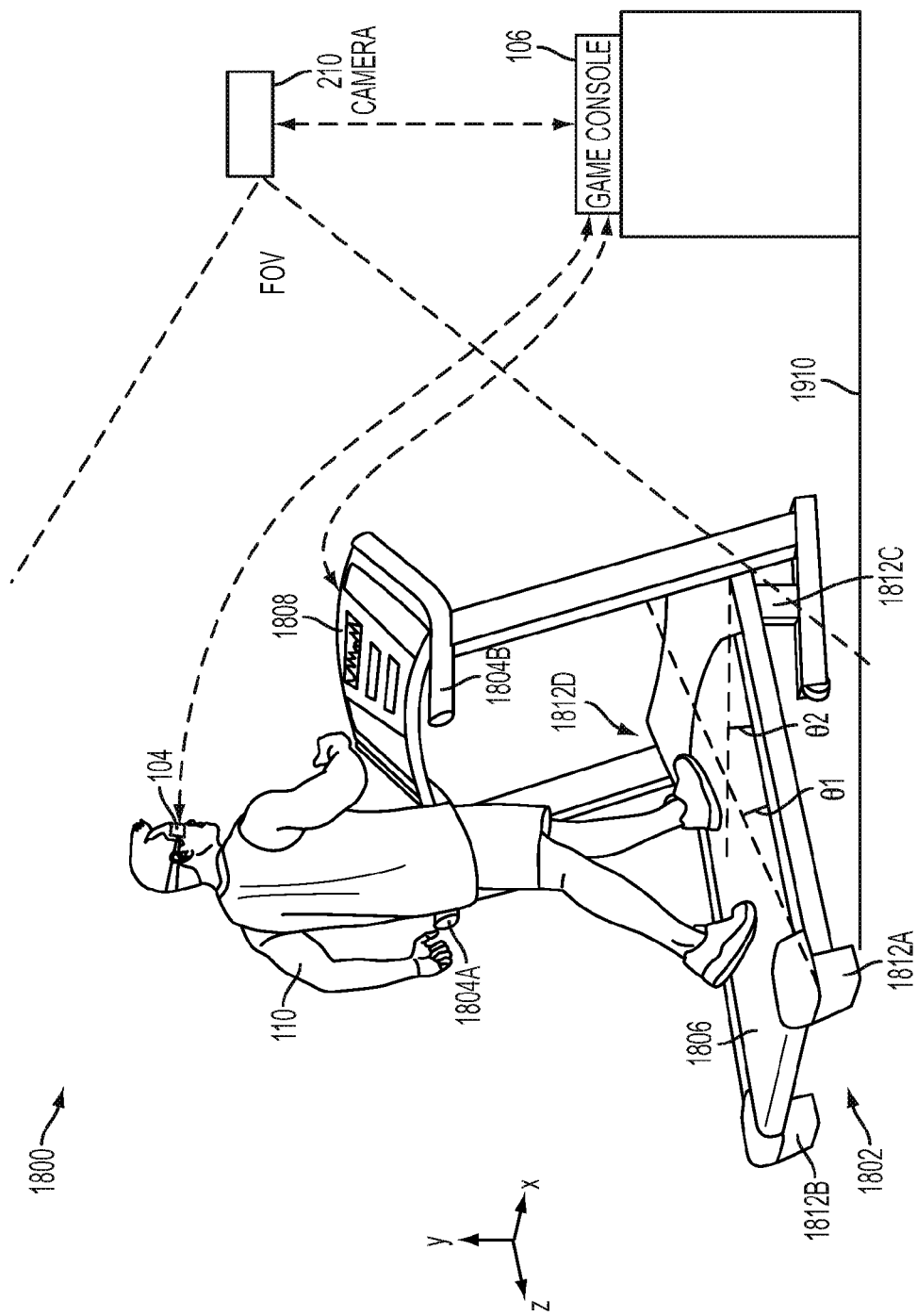
FIG. 18 is a diagram of a system for controlling an exercise machine based on an interaction by the user with an interactive program, in accordance with one embodiment of the present disclosure.

FIG. 18 is a diagram of an embodiment of a system 1800 for controlling an exercise machine 1802 based on an interaction with the interactive program by the user 110. The exercise machine 1802 is an example of the RCD 102 (FIG. 1). Although the exercise machine 1802 is illustrated as a treadmill, other examples of an exercise machine include an exercise bike, a rowing machine, an elliptical cross-trainer, a workout machine, etc. The exercise machine 1802 includes hand rails 1804A and 1804B, a running area 1804, and a display device 1808.

The camera 210 captures images of the body part of the user 110, e.g., hands of the user 110, legs of the user 110, head of the user 110, body of the user 110, etc., and of at least a portion of the exercise machine 1802. For example, the camera 210 captures images that show a spatial position of the body part of the user 110 with respect to a mechanical component, e.g., the hand rail 1804A, the hand rail 1804B, the running area 1806, etc.

The game console 106 sends the interactive data to the HMD 104 for display of the interactive content in the HMD 104. Examples of the interactive content include the virtual game in which the user 110 is ascending or descending a virtual terrain, e.g., a virtual mountain slope, a virtual snow slope, etc. The game console 106 further sends a signal indicating a spatial position of the running area 1806 with respect to a floor 1810 of a room on which the exercise machine 1802 is placed. The running area 1806 is positioned to form an angle θ1 with respect to the floor 1810 or is positioned to form an angle θ2 with respect to the floor 1802. For example, if the virtual game includes a display of the avatar 304 (FIG. 3A) climbing a virtual snow mountain, the game console 106 sends a signal to the exercise machine 1802 to position the running area 1806 at a positive angle, e.g., angle θ1, etc., with respect to the floor 1802. As another example, if the virtual game includes a display of the avatar 304 descending the virtual snow mountain, the game console 106 sends a signal to the exercise machine 1802 to position the running area at a negative angle, e.g., angle θ2, etc., with respect to the floor 1802. As another example, a signal is sent to the exercise machine 1802 by the game console 106 to contract piston and cylinder mechanisms 1812A and 1812B and/or to expand piston and cylinder mechanisms 1812C and 1812D (not visible in FIG. 18) to form a positive angle with respect to the floor 1910. As another example, a signal is sent to the exercise machine 1802 by the game console 106 to expand piston and cylinder mechanisms 1812A and 1812B and/or to contract piston and cylinder mechanisms 1812C and 1812D (not visible in FIG. 18) to form a negative angle with respect to the floor 1910.

Examples of a piston and cylinder mechanism include a pneumatic cylinder and hydraulic cylinder. In some embodiments, a piston and cylinder mechanism includes a piston and a cylinder. The piston is movable inside the cylinder to extend into the cylinder or to extend outside the cylinder. The piston and cylinder mechanism includes a pressurized air chamber from which egress of air is controlled via a valve. The valve is controlled electromagnetically via a driver that is further controlled by a position controller. The valve is controlled by the position controller to further control an amount of air entering from the pressurized air chamber into a chamber of the cylinder. The amount of air is controlled to change a spatial position of the piston in the cylinder. The piston and cylinder mechanism further includes another valve integrated within a side wall of the cylinder. The other valve is controlled via electromagnetic energy generated by a driver, which is further controlled by the position controller. The other valve is controlled to discharge air from the chamber of the cylinder to retract the piston from the chamber.

In various embodiments, a position and cylinder mechanism includes a piston, a cylinder, a motor, a number of rods, a piston, and a cylinder. The rods are connected to the motor to convert a rotational movement of the motor into a translational movement of the rods. The translational movement of the rods that are connected to the piston controls a translation movement of the piston into and out of the cylinder. The rotational motor is controlled by a position controller via a driver.

Moreover, based on image data of a spatial position of the body part of the user 110 captured by the camera 210, the game console 106 sends a signal to position the hand rails 1804A and 1804B to further protect the user 110 from losing control on the exercise machine 1802. For example, the camera 210 sends image data of an abdomen of the user 110 and an image of the running area 1806 to the game console 106. Based on the image data, the game console 106 determines that the abdomen does not lie within prescribed limits of the running area 1806. The game console 106 sends a signal to the exercise machine 1802 to position the hand rails 1804A and 1804B to prevent the user 110 from falling off the running area 1806. For example, the hand rails 1804A and 1804B are connected to piston and cylinder mechanisms that are controlled by a position controller via drivers. In this example, the piston and cylinder mechanisms are controlled to move the hand rails 1804A and 1804B along an x-axis, shown in FIG. 18, to close in on the user 110 to prevent the user 110 from falling off the running area 1806. In some embodiments, the piston and cylinder mechanisms are controlled to move the hand rails 1804A and 1804B along the x-axis to move away from the user 110.

In some embodiments, instead of sending a signal to position the hand rails 1804A and 1804B, the game console 106 sends a signal to the exercise machine 1802 to position the running area 1806 with respect to the hand rails 1804A and 1804B to prevent the user 110 from falling off the running area 1806. For example, the running area 1806 is connected to a number of piston and cylinder mechanisms for translating the running area 1806 with respect to the floor 1810, e.g., along the x-axis of FIG. 18, etc., to prevent the user 110 from falling off the running area 1806.

In various embodiments, each hand rail 1804A and 1804B is of any other shape, e.g., a curved shape, a combination of curved and straight shapes, etc., instead of having a straight shape.

Figure 19:
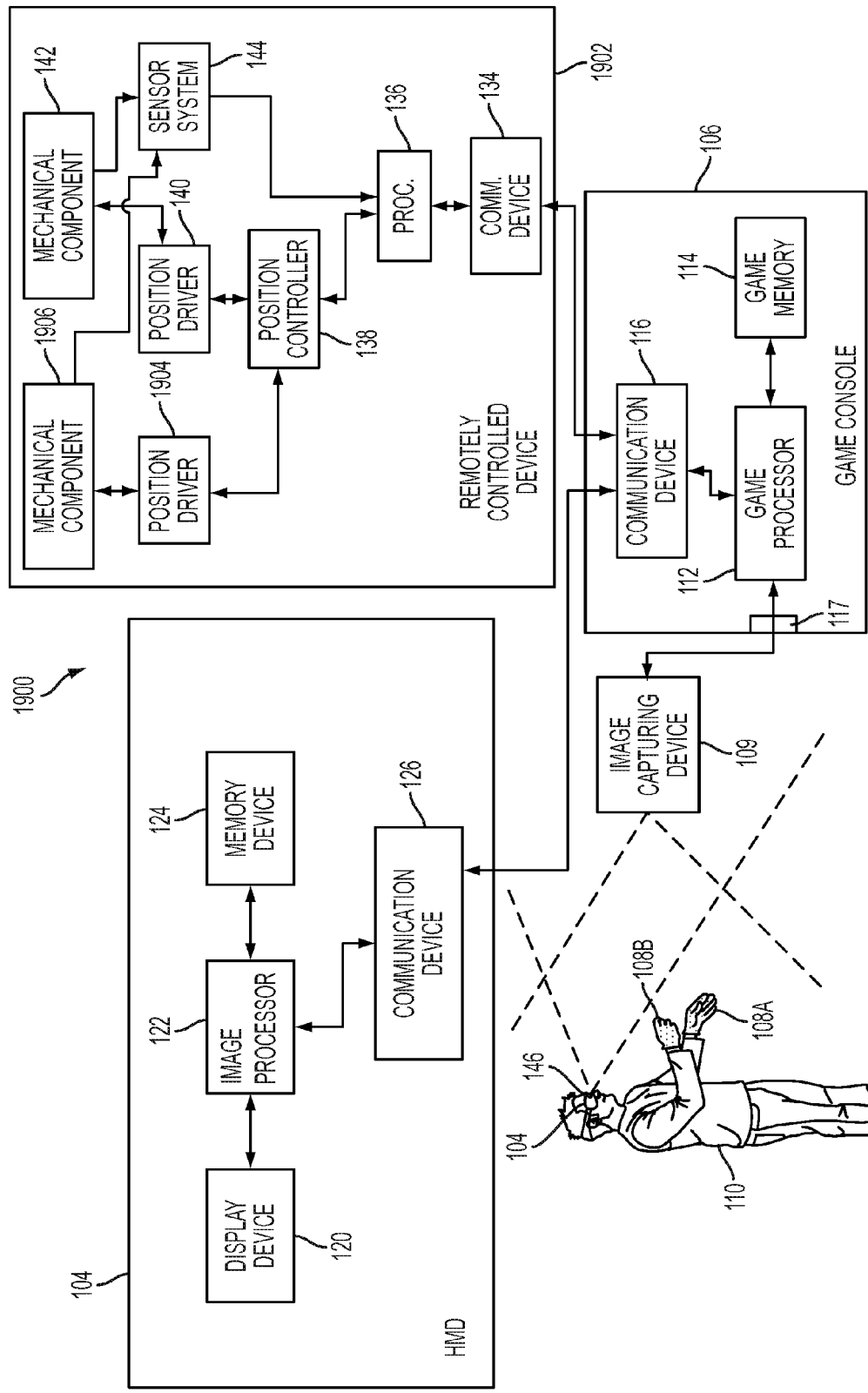
FIG. 19 is a diagram of a system for controlling an RCD based on a spatial position of the body part of the user and/or interactive data, in accordance with one embodiment of the present disclosure.

FIG. 19 is a diagram of an embodiment of a system 1900 for controlling an RCD 1902 based on a spatial position of the body part of the user 110 and/or the interactive data. The exercise machine 1802 (FIG. 18) is an example of the RCD 1902. For example, the piston and cylinder mechanism 1812A, 1812B, 1812C, or 1812D is an example of the mechanical component 142. As another example, the hand rails 1804A or 1804B is an example of a mechanical component 1906 of the exercise machine 1802.

The image capturing device 109 captures image data of the body part of the user 110 at a time the user 110 is watching the interactive content on the one or more display screens of the HMD 104. Moreover, image data regarding a spatial position of a contact surface of the mechanical component 142 and/or a contact surface of the mechanical component 1902 is also captured. All of the captured image data, e.g., the image data of the body part of the user 110 and the image data of the mechanical components 142 and 1902, etc., is sent via the communication device 117 (FIG. 1) to the game processor 112. Based on the image data, the game processor 112 determines whether a spatial position the body part of the user 110 is outside a pre-determined limit of a spatial position of a contact surface of the mechanical component 142 or a contact surface of the mechanical component 1902. For example, the game processor 112 determines from the image data whether the body part of the user 110 is in contact with the hand rail 1804A (FIG. 18) or the hand rail 1804B (FIG. 18). As another example, the game processor 112 determines from the image data whether a leg of the user 110 is at an edge of the running area 1806 (FIG. 18).

Upon determining that the spatial position of the body part of the user 110 is outside the pre-determined limit of the spatial position of a contact surface of the mechanical component 142 or the mechanical component 1902, the game processor 112 sends a signal to the processor 136 of the RCD 1902 via the communication devices 116 and 134 indicating a spatial position of a contact surface of the mechanical component 142 and/or a spatial position of a contact surface of the mechanical component 1906. The processor 136 sends the signal indicating the spatial position to the position controller 138. The position controller 138 determines a factor, e.g., speed, acceleration, pressure, etc., with which to operate the mechanical component 142, and further determines an amount of current to be sent to the position driver 140 based on the factor. Moreover, the position controller 138 determines the factor with which to operate the mechanical component 1906, and further determines an amount of current to be sent to the position driver 1904 based on the factor.

The position driver 140 sends a signal to the mechanical component 142 to drive the mechanical component 142 with the corresponding amount of current received from the position controller 138 and the position driver 1904 sends a signal to the mechanical component 1906 to drive the mechanical component 1906 with the corresponding amount of current received from the position controller 138.

The HMD 104 displays the interactive content on the one or more display screens of the HMD 104. The game processor 112 generates the interactive data that is processed by the IPU 122 to generate the interactive content. During the display of the interactive content, the game processor 112 determines a spatial position of a contact surface of the mechanical component 142 and a contact surface of the mechanical component 1906 to provide the user 110 with a real-world experience of interacting with the interactive content, e.g., playing a game in the real-world, etc. The spatial position is determined based on the interactive data. For example, when a scene of the virtual game involves going down a virtual slope of a virtual mountain, the game processor 112 determines a spatial position of a contact surface of the mechanical component 142 to be inclined at the angle θ2 (FIG. 18) and a spatial position of a contact surface of the mechanical component 1906 to surround or touch the user 110.

The game processor 112 sends the spatial positions of the contact surfaces of the mechanical components 142 and 1906 to the processor 136 via the communication devices 116 and 134. The processor 136 sends the spatial positions to the position controller 138 to further control the factor of the mechanical components 142 and 1906 as described above.

It should be noted that although some of the above-described embodiments relate to sending image data of the body part of the user 110, in several embodiments, instead of or in addition to the image data of the body part of the user 110, image data of the controller 108 is captured by the image capturing device 109 and is sent to the game processor 112 via the communication device 117.

In various embodiments, two or more position controllers instead of the position controller 136 are used to control the position drivers 140 and 1904. In various embodiments, an RCD excludes the processor 136. Instead, a signal indicating a spatial position of a mechanical component of an RCD is sent from the game processor 112 to a position controller of the RCD. In some embodiments, an operation of determining the factor from a spatial position of a mechanical component of an RCD is performed by the processor 136 of the RCD and an operation of determining an amount of current to be supplied to a driver is performed by a position controller of the RCD.

In various embodiments, instead of or in addition to using the image capturing device 109 to determine a spatial position of the body part of the user 110, a position sensor, e.g., a gyroscope, a magnetometer, etc., is fitted within to the body part of the user to determine a spatial position and orientation of the body part of the user 110. For example, instead of or in addition to using the image capturing device 109 to determine a spatial position of the head of the user 110, a gyroscope is fitted within the HMD 104 to determine an orientation of the head of the user 110. A position sensor provides sensed data indicating the spatial position and/or an orientation of the body part of the user 110 via the communication device 117 to the game processor 112.

Figure 20:
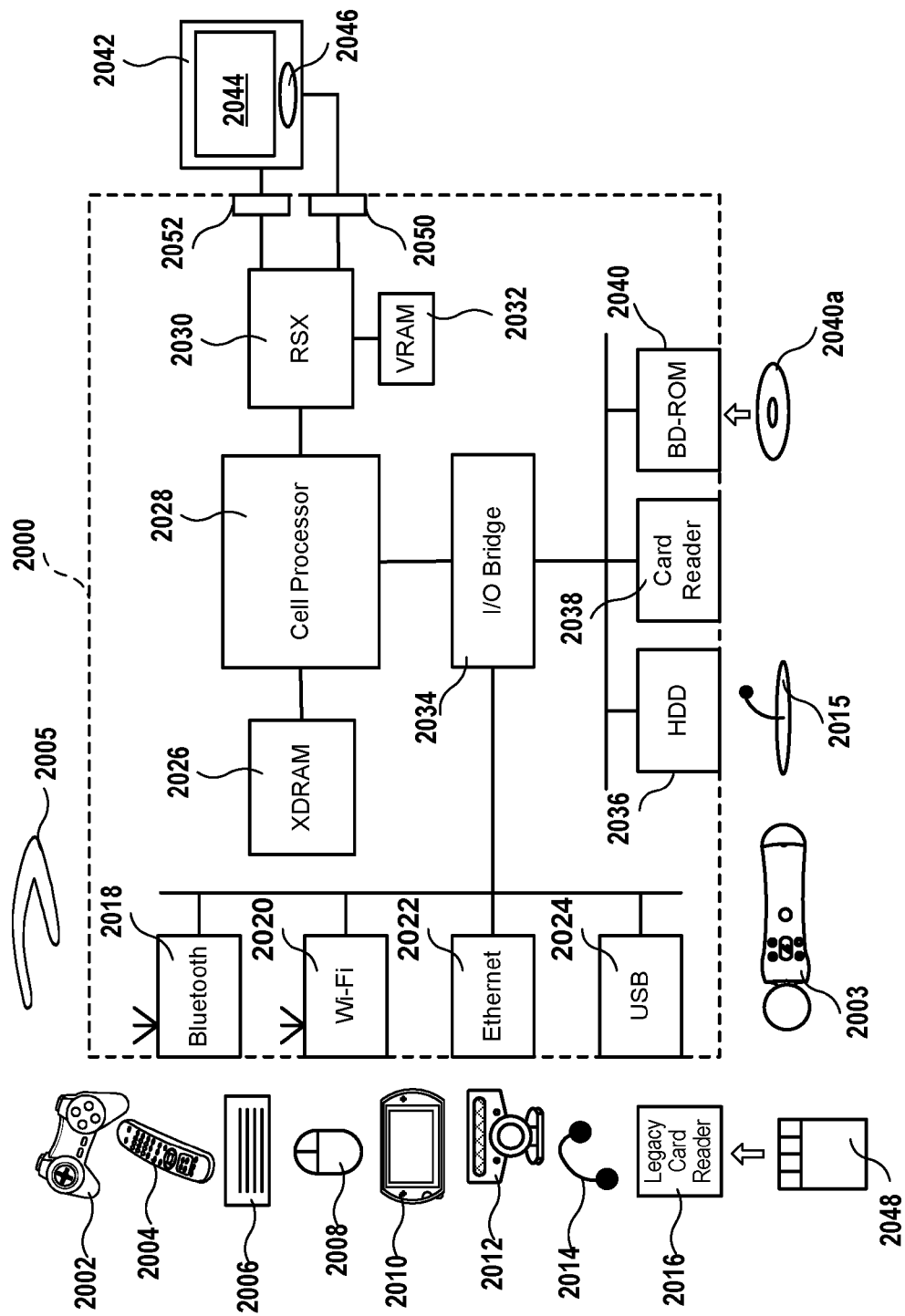
FIG. 20 is a block diagram of a game console that is compatible for interfacing with a controller and the HMD, in accordance with one embodiment of the present disclosure.

FIG. 20 is a block diagram of an embodiment of a game console 2000 that is compatible for interfacing with the controller 108 and an HMD 2005, which is an example of the HMD 104 (FIG. 1). The game console 2000 is used to execute and render a portion of the interactive program. The game console 2000 is compatible for interfacing the controller 108 and the HMD 2005 with the interactive program. The game console 2000 is provided, with various peripheral devices connectable to the game console 2000. The game console 2000 has a Rambus® dynamic random access memory (XDRAM) unit 2026, a cell processor 2028, a Reality Synthesizer graphics processor unit 2030 with a dedicated video random access memory (VRAM) unit 2032, and an input/output (I/O) bridge 2034. The game console 2000 also has a Blu Ray® Disk read-only memory (BD-ROM) optical disk reader 2040 for reading from a disk 2040a and a removable slot-in hard disk drive (HDD) 2036, accessible through the I/O bridge 2034. Optionally, the game console 2000 also includes a memory card reader 2038 for reading compact flash memory cards, Memory Stick® memory cards and the like, which is similarly accessible through the I/O bridge 2034.

The I/O bridge 2034 also connects to Universal Serial Bus (USB) ports 2024, a gigabit Ethernet port 2022, an IEEE 802.11b/g wireless network (Wi-Fi) port 2020, and a Bluetooth® wireless link port 2018 capable of supporting Bluetooth connections.

In operation, the I/O bridge 2034 handles all wireless, USB and Ethernet data, including data from one or more game controllers 2002 and 2003 and from the HMD 2005. For example, when the user 110 (FIG. 1) is playing the virtual game generated by execution of a portion of the interactive program, the I/O bridge 2034 receives input data from the game controller 2002 or 2003 or from the HMD 2005 via a Bluetooth link and directs the input data to the cell processor 2028, which updates a current state of the virtual game accordingly. Each game controller 2002 and 2003 is an example of the controller 108.

The wireless, USB and Ethernet ports also provide connectivity for other peripheral devices in addition to game controllers 2002 and 2003 and the HMD 2005, such as, for example, a remote control 2004, a keyboard 2006, a mouse 2008, a portable entertainment device 2010 such as a Sony Playstation Portable® entertainment device, a video camera such as an EyeToy® video camera 2012, a microphone headset 2014, and a microphone 2015. The video camera 2012 is an example of the image capturing device 109 (FIG. 1). In various embodiments, such peripheral devices are connected to the game console 2000 wirelessly. For example, the portable entertainment device 2010 communicates via a Wi-Fi ad-hoc connection, whilst the microphone headset 2014 communicates via a Bluetooth link.

The provision of these interfaces means that the game console 2000 is also potentially compatible with other peripheral devices such as digital video recorders (DVRs), set-top boxes, digital cameras, portable media players, Voice over IP telephones, mobile telephones, printers and scanners.

In addition, in some embodiments, a legacy memory card reader 2016 is connected to the game console 2000 via one of the USB ports 2024, enabling the reading of memory cards 2048 of a kind used by the game console 2000.

The game controllers 2002 and 2003 and the HMD 2005 are operable to communicate wirelessly with the game console 2000 via the Bluetooth link, or to be connected to one of the USB ports 2024, thereby also providing power by which to charge batteries of the game controller 2002 and 2003 and the HMD 2005. In some embodiments, each of the game controllers 2002 and 2003 and the HMD 2005 include a memory, a processor, a memory card reader, permanent memory such as flash memory, light emitters, microphone and speaker for ultrasound communications, an acoustic chamber, a digital camera, an internal clock, a recognizable shape such as the spherical section facing the game console 2000, and wireless communication devices using protocols, such as, for example, Bluetooth, Wi-Fi, etc. Examples of light emitters include LEDs, infrared lights, etc.

The game controller 2002 is designed to be used with two hands of the user 110, and game controller 2003 is a single-hand controller with an attachment. The HMD 2005 is designed to fit on top of a head and/or in front of eyes of the user 110. In addition to one or more analog joysticks and conventional control buttons, each game controller 2002 and 2003 is susceptible to three-dimensional spatial location determination. Similarly, the HMD 2005 is susceptible to three-dimensional spatial location determination. Consequently gestures and movements by the user 110 of the game controller 2002 and 2003 and of the HMD 2005 are translated as inputs to the virtual game in addition to or instead of conventional button or joystick commands Optionally, other wirelessly enabled peripheral devices such as the Playstation™ Portable device is used as a controller. In the case of the Playstation™ Portable device, additional game or control information (for example, control instructions or number of lives) is provided on a display screen of the device. In some embodiments, other alternative or supplementary control devices are also used, such as, a dance mat (not shown), a light gun (not shown), and a steering wheel and pedals (not shown) or bespoke controllers, such as, a single or several large buttons for a rapid-response quiz game (also not shown).

The remote control 2004 is also operable to communicate wirelessly with the game console 2000 via a Bluetooth link. The remote control 2004 comprises controls suitable for the operation of the Blu Ray™ Disk BD-ROM reader 2040 and for the navigation of disk content.

The Blu Ray™ Disk BD-ROM reader 2040 is operable to read CD-ROMs compatible with the game console 2000, in addition to conventional pre-recorded and recordable CDs, and so-called Super Audio CDs. The reader 2040 is also operable to read digital video disk-ROMs (DVD-ROMs) compatible with the game console 2000, in addition to conventional pre-recorded and recordable DVDs. The reader 2040 is further operable to read BD-ROMs compatible with the game console 2000, as well as conventional pre-recorded and recordable Blu-Ray Disks.

The game console 2000 is operable to supply audio and video, either generated or decoded via the Reality Synthesizer graphics unit 2030, through audio connectors 2050 and video connectors 2052 to a display and sound output device 2042, such as, a computer monitor, a display and sound output device of the HMD 2005, a television set, etc. The display and sound output device 204 has a display screen 2044 and one or more loudspeakers 2046, etc. The audio connectors 2050 include conventional analogue and digital outputs whilst the video connectors 2052 include component video, S-video, composite video and one or more High Definition Multimedia Interface (HDMI) outputs, etc. Consequently, video output is in formats, such as, phase alternating line (PAL), national television system committee (NTSC), 520p, 1080i, 1080p high definition, etc.

Audio processing (generation, decoding and so on) is performed by the cell processor 2028. An operating system of the game console 2000 supports Dolby® 5.1 surround sound, Dolby® Theatre Surround (DTS), and the decoding of 7.1 surround sound from Blu-Ray® disks.

In some embodiments, a video camera, e.g., the video camera 2012, etc., comprises a single charge coupled device (CCD), an LED indicator, and hardware-based real-time data compression and encoding apparatus so that compressed video data is transmitted in an appropriate format such as an intra-image based MPEG (motion picture expert group) standard for decoding by the game console 2000. An LED indicator of the video camera 2012 is arranged to illuminate in response to appropriate control data from the game console 2000, for example to signify adverse lighting conditions. Some embodiments of the video camera 2012 variously connect to the game console 2000 via a USB, Bluetooth or Wi-Fi communication port. Some embodiments of a video camera include one or more associated microphones and are capable of transmitting audio data. In embodiments of a video camera, the CCD has a resolution suitable for high-definition video capture. In use, images captured by the video camera are, for example, incorporated within the virtual game or interpreted as game control inputs. In another embodiment, a video camera is an infrared camera suitable for detecting infrared light.

In various embodiments, in order for successful data communication to occur with a peripheral device, such as, for example, a video camera or remote control via one of the communication ports of the game console 2000, an appropriate piece of software such as a device driver is provided.

Figure 21:
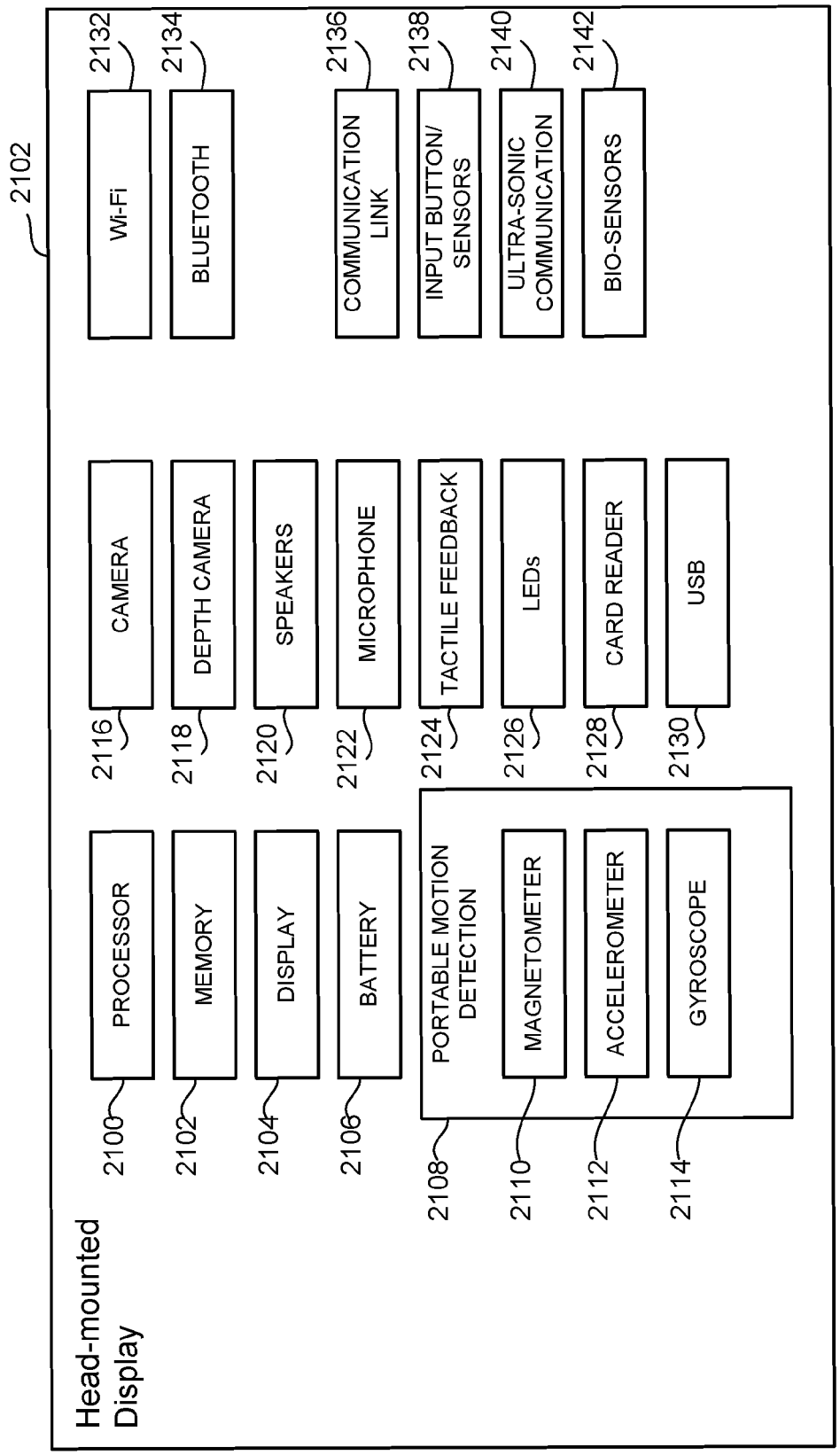
FIG. 21 is a block diagram of an embodiment of an HMD, in accordance with one embodiment of the present disclosure.

With reference to FIG. 21, a diagram illustrating example components of a head-mounted display 2102 is shown. The HMD 2102 is an example of the HMD 104 (FIG. 1). It should be understood that in various embodiments, more or less components are included or excluded from the HMD 2102, depending on the configuration and functions enabled. The HMD 2102 includes a processor 2100 for executing program instructions. A memory 2102 is provided for storage purposes, and in some embodiments, includes both volatile and non-volatile memory. A display 2104 is included and provides a visual interface that the user 110 views. The display 2104 is defined by one single display, or in the form of a separate display screen for each eye. When two display screens are provided, it is possible to provide left-eye content and right-eye video content separately. Separate presentation of video content to each eye of the user 110 provides for immersive control of three-dimensional (3D) content. In one embodiment, a screen of the display 2104 is provided with screen content of the HMD 2102 by using an output for one eye, and then formatting the content for display in a 2D format. The one eye, in one embodiment, is the left-eye video feed, but in other embodiments, is the right-eye video feed.

A battery 2106 is provided as a power source for the HMD 2102. In other embodiments, the power source can include an outlet connection to power. In other embodiments, an outlet connection to power and the battery 2106 is provided. A motion detection module 2108 includes any of various kinds of motion sensitive hardware, such as a magnetometer 2110, an accelerometer 2112, and a gyroscope 2114.

An accelerometer is a device for measuring acceleration and gravity induced reaction forces. Single and multiple axis (e.g., six-axis) models are able to detect magnitude and direction of the acceleration in different directions. The accelerometer is used to sense inclination, vibration, and shock. In one embodiment, three accelerometers 2112 are used to provide the direction of gravity, which gives an absolute reference for two angles (world-space pitch and world-space roll).

A magnetometer measures the strength and direction of the magnetic field in the vicinity of the HMD 2102. In one embodiment, three magnetometers 2110 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field is warped due to metal in the environment, which causes a warp in the yaw measurement. In some embodiments, this warp is calibrated using information from other sensors such as the gyroscope or the camera. In one embodiment, the accelerometer 2112 is used together with magnetometer 2110 to obtain an inclination and azimuth of the HMD 2102.

A gyroscope is a device for measuring or maintaining orientation, based on the principles of angular momentum. In one embodiment, three gyroscopes 2114 provide information about movement across the respective axis (x, y and z) based on inertial sensing. The gyroscopes help in detecting fast rotations. However, in some embodiments, the gyroscopes drift overtime without the existence of an absolute reference. The drifting is addressed by resetting the gyroscopes periodically, which is done using other available information, such as positional/orientation determination based on visual tracking of an object, accelerometer, magnetometer, etc.

A camera 2116 is provided for capturing images and image streams of the real-world environment. Optionally, more than one camera is included in the HMD 2102, including a camera that is rear-facing, which is directed away from the user 110 when the user 110 is viewing the display of the HMD 2102, and a camera that is front-facing, which is directed towards the user when the user is viewing the display of the HMD 2102. Additionally, a depth camera 2118 is included in the head-mounted display 2102 for sensing depth information of objects in the real-world environment.

The HMD 2102 includes speakers 2120 for providing audio output. Also, a microphone 2122 is included for capturing audio from the real-world environment, including sounds from an ambient environment, speech of the user 110, etc. The HMD 2102 includes a tactile feedback module 2124 for providing tactile feedback to the user 110. In one embodiment, the tactile feedback module 2124 is capable of causing movement and/or vibration of the HMD 2102 so as to provide tactile feedback to the user 110.

LEDs 2126 are provided as visual indicators of statuses of the HMD 2102. For example, an LED indicates a battery level, power on, etc. A card reader 2128 is provided to enable the HMD 2102 to read and write information to and from a memory card. A USB interface 2130 is included as one example of an interface for enabling connection of peripheral devices, or connection to other devices, such as other portable devices, computers, game consoles, etc. In various embodiments of the HMD 2102, any of various kinds of interfaces are included to enable greater connectivity of the HMD 2102.

A Wi-Fi module 2132 is included for enabling connection to the computer network via wireless networking technologies. Also, the HMD 2102 includes a Bluetooth module 2134 for enabling wireless connection to other devices. A communications link 2136 is also included for connection to other devices. In one embodiment, the communications link 2136 utilizes infrared transmission for wireless communication. In other embodiments, the communications link 2136 utilizes any of various wireless or wired transmission protocols for communication with other devices.

Input buttons/sensors 2138 are included to provide an input interface for the user 110. In some embodiments, any of various kinds of input interfaces are included, such as buttons, touchpad, joystick, trackball, etc. An ultra-sonic communication module 2140 is included in HMD 2102 for facilitating communication with other devices via ultra-sonic technologies.

Bio-sensors 2142 are included to enable detection of physiological data from the user 110. In one embodiment, the bio-sensors 2142 include one or more dry electrodes for detecting bio-electric signals of the user 110 through the user's skin, voice detection, eye retina detection to identify users/profiles, etc.

The foregoing components of HMD 2102 have been described as exemplary components that are included in the HMD 2102. In some embodiments, the HMD 2102 includes or excludes some of the various aforementioned components. For example, the HMD 2102 excludes the tactile feedback module 2124. As another example, the HMD 2102 excludes the magnetometer 2110, or the accelerometer 2112, or the gyroscope 2114, or a combination thereof. As yet another example, the HMD 2102 excludes the bio-sensors 2142. In various embodiments, the HMD 2102 includes other components not presently described, but known in the art, for purposes of facilitating aspects described in the present disclosure.

In some embodiments, clients and/or client devices, as referred to herein, include HMDs, terminals, personal computers, game consoles, tablet computers, telephones, set-top boxes, kiosks, wireless devices, digital pads, stand-alone devices, handheld game playing devices, and/or the like. The clients receive encoded video streams, decode the video streams, and present the resulting video to a user, e.g., a player of a game. The processes of receiving encoded video streams and/or decoding the video streams typically include storing individual video frames in a receive buffer of the client. The video streams are presented to the user on a display integral to client or on a separate device such as a monitor or television.

Clients are optionally configured to support more than one game player, e.g., the user 110, etc. For example, a game console supports two, three, four or more simultaneous players (e.g., P1, P2, . . . Pn). Each of these players receive or share a video stream, or a single video stream includes regions of a frame generated specifically for each player, e.g., generated based on each player's point of view. Any number of clients are local (e.g., co-located) or are geographically dispersed. The number of clients included in a game system varies widely from one or two to thousands, tens of thousands, or more. As used herein, the term "game player" is used to refer to a person that plays a game and the term "game playing device" is used to refer to a device used to play a game.

In some embodiments, the game playing device refers to a plurality of computing devices that cooperate to deliver a game experience to the user 110. For example, the game console 106 and the HMD 104 cooperate with a video server system to deliver a game viewed through the HMD 104. In one embodiment, the game console 106 receives the video stream from the video server system and the game console 106 forwards the video stream, or updates to the video stream, to the HMD 104 and/or a television for rendering.

In various embodiments, the clients include systems for modifying received video. For example, a client performs further rendering, to overlay one video image on another video image, to crop a video image, and/or the like. In several embodiments, clients receive various types of video frames, such as I-frames, P-frames and B-frames, and to process these frames into images for display to the user 110. In some embodiments, a client performs further rendering, shading, conversion to 3-D, conversion to 2D, distortion removal, sizing, or like operations on the video stream. A client is optionally configured to receive more than one audio or video stream.

Input devices of clients include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

A video source includes rendering logic, e.g., hardware, firmware, and/or software stored on a computer-readable medium, such as, storage. This rendering logic is configured to create video frames of a video stream based on a game state. All or part of the rendering logic is optionally disposed within one or more graphics processing units (GPUs). The rendering logic includes processing stages for determining three-dimensional spatial relationships between objects and/or for applying appropriate textures, etc., based on the game state and viewpoint. The rendering logic produces raw video that is encoded. For example, the raw video is encoded according to an Adobe Flash® standard, HTML-5, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a device. The video stream is characterized by a frame size and a frame rate. Examples of frame sizes include 800×600, 1280×720 (e.g., 720p), 1024×768, 1080p. The frame rate is the number of video frames per second.

In some embodiments, a video stream includes different types of video frames. For example, the H.264 standard includes a "P" frame and a "I" frame. I-frames include information to refresh all macro blocks/pixels on a display device, while P-frames include information to refresh a subset thereof. P-frames are smaller in data size than are I-frames. As used herein the term "frame size" is meant to refer to a number of pixels within a frame. The term "frame data size" is used to refer to a number of bytes to store the frame.

In some embodiments, the client is a general purpose computer, a special purpose computer, a gaming console, a personal computer, a laptop computer, a tablet computer, a mobile computing device, a portable gaming device, a cellular phone, a set-top box, a streaming media interface/device, a smart television or networked display, or any other computing device capable of being configured to fulfill the functionality of a client as defined herein. In one embodiment, a cloud gaming server detects a type of client device, which is being utilized by the user 110, and provides a cloud-gaming experience appropriate to the client device used by the user 110. For example, image settings, audio settings and other types of settings are optimized for the client device used by the user 110.

Figure 22:
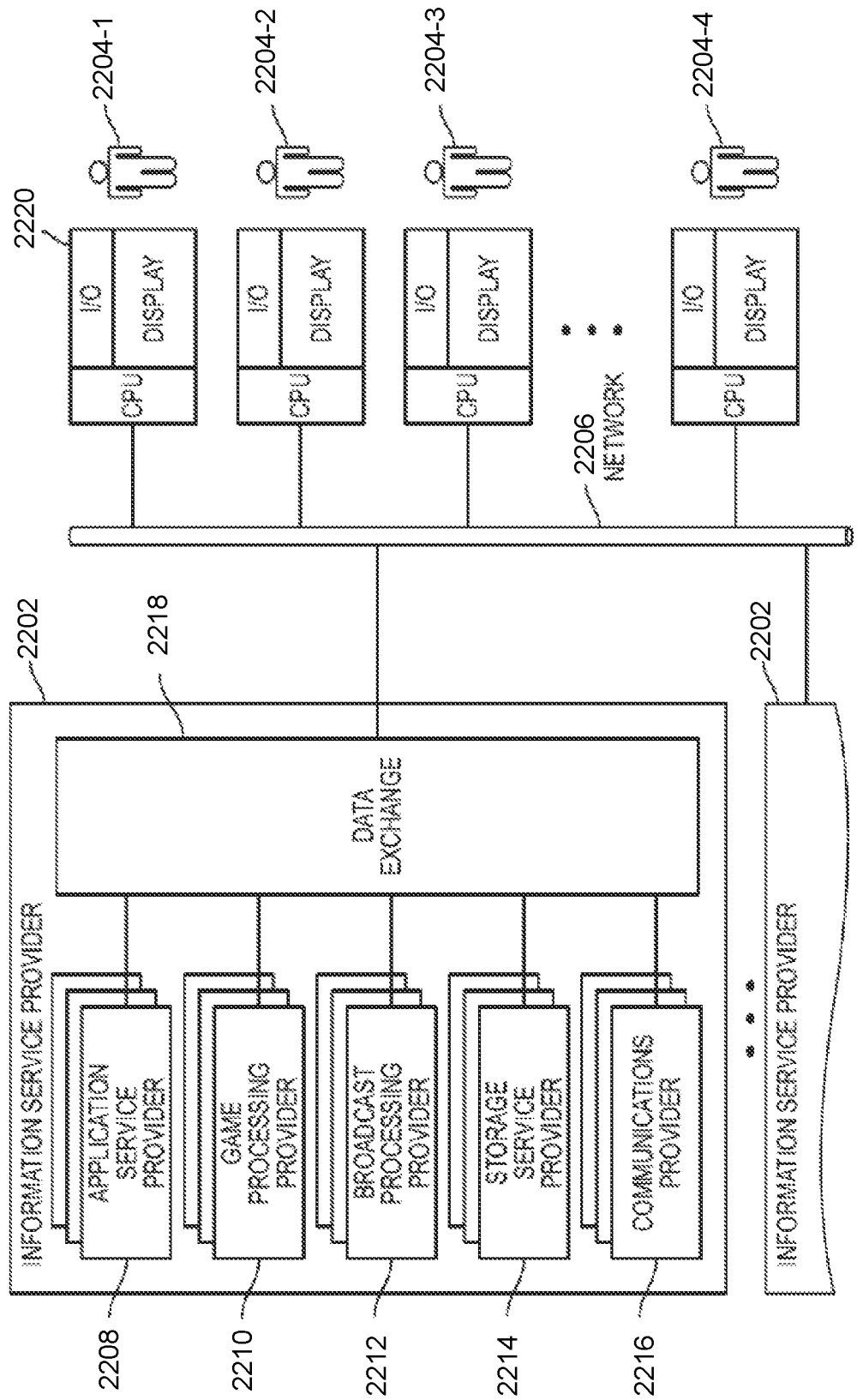
FIG. 22 illustrates an embodiment of an Information Service Provider architecture (ISP) that delivers a multitude of information services to users geographically dispersed and connected via a computer network, in accordance with one embodiment of the present disclosure.

FIG. 22 illustrates an embodiment of an Information Service Provider (ISP) architecture. An ISP 2202 delivers a multitude of information services to users 2204-1, 2204-2, 2204-3, and 2204-4 geographically dispersed and connected via a network 2206, e.g., the computer network, etc. The user 110 (FIG. 1) is an example of the user 2204-1, or the user 2204-2, of the user 2204-3, or the user 2204-4. An ISP delivers one type of service, such as stock price updates, or a variety of services such as broadcast media, news, sports, gaming, etc.

In some embodiments, the services offered by each ISP are dynamic, for example, services are added or taken away at any point in time. Thus, the ISP providing a particular type of service to a particular individual change over time. For example, the user 110 is served by an ISP in near proximity to the user 110 while the user 110 is in her home town, and the user 110 is served by a different ISP when the user 110 travels to a different city. The home-town ISP will transfer the information and data to the new ISP, such that the user information "follows" the user 110 to the new city making the data closer to the user 110 and easier to access.

In various embodiments, a master-server relationship is established between a master ISP, which manages the information for the user 110, and a server ISP that interfaces directly with the user 110 under control from the master ISP. In several embodiments, the data is transferred from one ISP to another ISP as the client moves around the world to make the ISP in better position to service the user 110 is the one that delivers these services.

The ISP 2202 includes an Application Service Provider (ASP) 2208, which provides computer-based services to customers over the computer network. Software offered using an ASP model is also sometimes called on-demand software or software as a service (SaaS). A form of providing access to a particular application program (such as customer relationship management) is by using a standard protocol, such as, a hypertext transfer protocol (HTTP). The application software resides on a vendor's system and is accessed by the users 2204-1, 2204-2, 2204-3, and 2204-4 through a web browser using hypertext markup language (HTML), by special purpose client software provided by the vendor, or other remote interface, such as, a thin client.

Services delivered over a wide geographical area often use cloud computing. Cloud computing is a style of computing in which dynamically scalable and often virtualized resources are provided as a service over the Internet. The users 2204-1, 2204-2, 2204-3, and 2204-4 do not need to be an expert in technology infrastructure in the "cloud" that supports them. In some embodiments, cloud computing is divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, the 2202 2270 includes a Game Processing Server (GPS) 2210, which is used by game clients to play single and multiplayer video games. Most video games played over the computer network operate via a connection to a game server. Some games use a dedicated server application that collects data from players and distributes it to other players. This is more efficient and effective than a peer-to-peer arrangement, but it uses a separate server to host the server application. In another embodiment, the GPS 2210 establishes communication between the players and their respective game-playing devices exchange information without relying on a centralized GPS.

In some embodiments, dedicated GPSs are servers that run independently of the client. Such servers run on dedicated hardware located in data centers, providing more bandwidth and dedicated processing power. Dedicated servers are a method of hosting game servers for most portable computer-based (PC-based) multiplayer games. Massively multiplayer online games run on dedicated servers usually hosted by a software company that owns a game title, allowing them to control and update content.

A broadcast Processing Server (BPS) 2212 distributes audio or video signals to an audience. Broadcasting to a narrow range of audience is sometimes called narrowcasting. A final leg of broadcast distribution is how the signal gets to a listener or viewer, and the final leg is received over the air as with a radio station or TV station to an antenna and receiver, or is received through cable television (TV) or cable radio (or "wireless cable") via the station or directly from the computer network. In some embodiments, the computer network brings either radio or TV to a recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the interactive content is able to reach almost any country in the world.

A Storage Service Provider (SSP) 214 provides computer storage space and related management services. SSPs also offer periodic backup and archiving. By offering storage as a service, the users 2204-1, 2204-2, 2204-3, and 2204-4 order more storage as desired. Another major advantage is that SSPs include backup services and users will not lose all their data if their computers' hard drives fail. Further, a plurality of SSPs can have total or partial copies of the user data, allowing the users 2204-1, 2204-2, 2204-3, and 2204-4 to access data in an efficient way independently of where the user 110 is located or the device being used to access the data. For example, the user 110 accesses personal files in a home computer, as well as in a mobile phone while the user 110 is on the move.

A Communications Provider 2216 provides connectivity to the users 2204-1, 2204-2, 2204-3, and 2204-4. One kind of Communications Provider is an Internet Service Provider, who offers access to the computer network. The ISP connects its customers using a data transmission technology appropriate for delivering Internet Protocol datagrams, such as dial-up, digital subscriber line (DSL), cable modem, fiber, wireless or dedicated high-speed interconnects. In some embodiments, the Communications Provider 2216 also provides messaging services, such as e-mail, instant messaging, and Short Message Service (SMS) texting. Another type of Communications Provider is a Network Service provider (NSP), who sells bandwidth or network access by providing direct backbone access to the computer network. Examples of network service providers include telecommunications companies, data carriers, wireless communications providers, Internet Service Providers, cable television operators offering high-speed Internet access, etc.

A Data Exchange 2218 interconnects the several modules inside ISP 2202 and connects these modules to the users 2204-1, 2204-2, 2204-3, and 2204-4 via the network 2206. The Data Exchange 2218 covers a small area where all the modules of ISP 2202 are in close proximity, or covers a large geographic area when the different modules are geographically dispersed. For example, the Data Exchange 2218 includes a fast Gigabit Ethernet (or faster) within a cabinet of a data center, or an intercontinental virtual area network (VLAN).

The users 2204-1, 2204-2, 2204-3, and 2204-4 access the remote services with corresponding client devices 2220, each of which includes at least a CPU, a display and an I/O. Examples of a client device include a PC, a mobile phone, a netbook, a tablet, a gaming system, an HMD, a personal digital assistant (PDA), a gaming console, etc. In one embodiment, the ISP 2202 recognizes a type of device used by the client and adjusts the communication method employed. In other cases, client devices 2220 use a standard communications method, such as HTTP, to access the ISP 2202.

It should be noted that although some of the embodiments are described above with reference to a spatial position of a body part of the user 110 (FIG. 1), in some embodiments, the embodiments also apply to a spatial position associated with the body part, e.g., a spatial position of a position device, a spatial position of the body part, etc. Examples of the position device include a hand-held controller, a joystick, the PlayStation Move™ controller, a glove controller, etc. Examples of the glove controller include the glove 108A and the glove 108B (FIG. 1).

Embodiments of the present disclosure are practiced with various computer system configurations including hand-held devices, microprocessor systems, microprocessor-based or programmable consumer electronics, minicomputers, mainframe computers and the like. Several embodiments of the present disclosure can also be practiced in distributed computing environments where tasks are performed by remote processing devices that are linked through a wire-based or wireless network.

With the above embodiments in mind, it should be understood that a number of embodiments of the present disclosure employ various computer-implemented operations involving data stored in computer systems. These operations are those involving physical manipulation of physical quantities. Any of the operations described herein that form part of various embodiments of the present disclosure are useful machine operations. Several embodiments of the present disclosure also relate to a device or an apparatus for performing these operations. The apparatus is specially constructed for the required purpose, or the apparatus is a general-purpose computer selectively activated or configured by a computer program stored in the computer. In some embodiments, various general-purpose machines are used with computer programs written in accordance with the teachings herein, or it is more convenient to construct a more specialized apparatus to perform the required operations.

Various embodiments of the present disclosure are embodied as computer-readable code on a non-transitory computer-readable medium. The non-transitory computer-readable medium is any data storage device that can store data, which is thereafter be read by a computer system. Examples of the non-transitory computer-readable medium include hard drives, network attached storage (NAS), read-only memory (ROM), random-access memory, compact disc-ROMs (CD-ROMs), CD-recordables (CD-Rs), CD-rewritables (RWs), magnetic tapes and other optical and non-optical data storage devices. In some embodiments, the non-transitory computer-readable medium include computer-readable tangible medium distributed over a network-coupled computer system so that the computer-readable code is stored and executed in a distributed fashion.

In some embodiments, any of the embodiments described above are combined with any of the remaining embodiments described above.

Although the method operations were described in a specific order, it should be understood that in some embodiments, other housekeeping operations are performed in between operations, or operations are adjusted so that they occur at slightly different times, or are distributed in a system which allows the occurrence of the processing operations at various intervals associated with the processing, as long as the processing of the overlay operations are performed in the desired way.

Although various embodiments have been described in some detail in the present disclosure for purposes of clarity of understanding, it will be apparent that certain changes and modifications are practiced within the scope of the appended claims. Accordingly, the present embodiments are to be considered as illustrative and not restrictive, and the various embodiments described in the present disclosure are not to be limited to the details given herein, but are modified within the scope and equivalents of the appended claims.

The invention claimed is:

1. A system comprising:
    a head mounted display (HMD) for displaying a game, wherein the HMD is configured to be worn by a user; and
    a game console coupled to the head mounted display, the game console including a gaming processor configured to:
        send interactive content for rendering in the HMD;
        receive image data associated with a body part of the user while the HMD is worn by the user;
        determine a position associated with the body part of the user in a real-world environment from the image data;
        generate an instruction based on the interactive content rendered in the HMD and the position associated with the body part; and
        send the instruction to a remotely-controlled device (RCD),
        wherein the RCD includes a communication circuit configured to receive the instruction from the game console,
        wherein the RCD further includes a contact surface,
        wherein upon the reception of the instruction, the RCD is configured to fly to place the contact surface to be proximate to the position associated with the body part, wherein the placement of the contact surface proximate to the position associated with the body part of the user is rendered in the HMD as virtual contact with a virtual object in the interactive content.

2. The system of claim 1, wherein the RCD includes:
    a mechanical component; and
    a position controller coupled to the mechanical component and to the communication circuit,
    wherein the position controller is configured to receive the instruction from the gaming processor,
    wherein the position controller is configured to control, based on the instruction, the mechanical component to further control a position of the contact surface,
    wherein the position controller is configured to control the position of the contact surface to place the contact surface proximate to the position associated with the body part of the user.

3. The system of claim 2, wherein the mechanical component is a propeller of a drone.

4. The system of claim 1, wherein the RCD is a drone.

5. The system of claim 1, wherein the gaming processor is configured to:
    determine a spatial position of the virtual object displayed within the interactive content;
    determine a spatial position of a representation of the body part, the representation displayed within the interactive content; and
    determine whether the spatial position of the representation of the body part is within a pre-determined range from the spatial position of the virtual object,
    wherein the instruction is sent to control the position of the contact surface when the spatial position of the representation of the body part is within the pre-determined range from the spatial position of the virtual object.

6. The system of claim 1, wherein the gaming processor is configured to:
    determine a spatial position of a representation of the body part from the image data;
    associate the spatial position of the representation of the body part in the image data with a spatial position of a representation of the body part in the interactive content;
    determine a spatial position of the virtual object in the interactive content;
    determine whether the spatial position of the representation of the body part in the interactive content is within a pre-determined distance from the spatial position of the virtual object in the interactive content, wherein the instruction is sent to control the position of the contact surface when the spatial position of the representation of the body part in the interactive content is within the pre-determined distance from the spatial position of the virtual object in the interactive content.

7. The system of claim 1, wherein the gaming processor is configured to determine x, y, and z co-ordinates of the body part or of a position device attached to the body part from a reference point in the real-world environment to determine the position associated with the body part from the image data.

8. The system of claim 1, wherein the interactive data includes image data used to render a virtual display of the game.

9. The system of claim 1, further comprising an image capturing device configured to capture the image data and send the image data to the gaming processor.

10. A method comprising:
sending interactive content from a game console to for rendering in a head-mounted display (HMD);
receiving image data associated with a body part of a user while the HMD is worn by a user;
determining a position associated with the body part of the user in a real-world environment from the image data;
generating an instruction based on the interactive content rendered in the HMD and the position associated with the body part; and
sending the instruction to a remotely-controlled device (RCD),
receiving the instruction from the game console;
upon said receiving of the instruction, flying to place a contact surface of the RCD to be proximate to the position associated with the body part, wherein the placement of the contact surface proximate to the position associated with the body part of the user is rendered in the HMD as virtual contact with a virtual object in the interactive content.

11. The method of claim 10, further comprising:
controlling a mechanical component of the RCD to control the position of the contact surface to place the contact surface proximate to the position associated with the body part of the user during a play of the game.

12. The method of claim 11, wherein the mechanical component is a propeller of a drone.

13. The method of claim 10, wherein the RCD is a drone.

14. The method of claim 10, further comprising:
determining a spatial position of the virtual object displayed within the interactive content;
determining a spatial position of a representation of the body part, the representation displayed within the interactive content; and
determining whether the spatial position of the representation of the body part is within a pre-determined range from the spatial position of the virtual object,
wherein sending the instruction to the RCD is performed when the spatial position of the representation of the body part is within the pre-determined range from the spatial position of the virtual object.

15. The method of claim 10, further comprising:
determining a spatial position of a representation of the body part from the image data;
associating the spatial position of the representation of the body part in the image data with a spatial position of a representation of the body part in the interactive content;
determining a spatial position of the virtual object in the interactive content;
determining whether the spatial position of the representation of the body part in the interactive content is within a pre-determined distance from the spatial position of the virtual object in the interactive content,
wherein sending the instruction to the RCD is performed when the spatial position of the representation of the body part in the interactive content is within the pre-determined distance from the spatial position of the virtual object in the interactive content.

16. The method of claim 10, further comprising determining x, y, and z co-ordinates of the body part or of a position device attached to the body part from a reference point in the real-world environment to determine the position associated with the body part from the image data.

17. The method of claim 10, wherein the interactive data includes image data used to render a virtual display of the game.

18. The method of claim 10, further comprising:
capturing the image data; and
sending the image data to the gaming processor.

19. A method comprising:
sending interactive content for rendering on a head mounted display (HMD), the HMD configured to be worn by a user for playing a game;
receiving image data associated with a body part of the user while the HMD is worn by the user;
tracking a plurality of positions associated with the body part of the user in a real-world environment from the image data associated with the body part of the user; and
for a transition from a first state of rendering by the HMD to a second state of rendering by the HMD and for a transition from one of the positions associated with the body part to another one of the positions associated with the body part, controlling a position of a remotely-controlled device (RCD) to fly from one position to another position to be placed proximate to the other position associated with the body part, wherein the placement of the RCD proximate to the other position associated with body part of the user is rendered in the HMD as virtual contact with a virtual object in the interactive content.

20. The method of claim 19, further comprising:
determining a spatial position of the virtual object displayed within the interactive content;
determining a spatial position of a representation of the body part, the representation of the body part displayed within the interactive content;
determining whether the spatial position of the representation of the body part is within a pre-determined range from the spatial position of the virtual object,
wherein controlling the position of the RCD is performed when the spatial position of the representation of the body part is within the pre-determined range from the spatial position of the virtual object.

21. The method of claim 19, wherein the RCD is a drone.

* * * * *